US010707799B2

(12) United States Patent
Ishizuka

(10) Patent No.: US 10,707,799 B2
(45) Date of Patent: Jul. 7, 2020

(54) POWER CONVERTING DEVICE

(71) Applicant: Mitsubishi Electric Corporation, Chiyoda-ku (JP)

(72) Inventor: Mitsuru Ishizuka, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 32 days.

(21) Appl. No.: 15/781,637

(22) PCT Filed: Nov. 22, 2016

(86) PCT No.: PCT/JP2016/084585
§ 371 (c)(1),
(2) Date: Jun. 5, 2018

(87) PCT Pub. No.: WO2017/141513
PCT Pub. Date: Aug. 24, 2017

(65) Prior Publication Data
US 2018/0358915 A1 Dec. 13, 2018

(30) Foreign Application Priority Data

Feb. 17, 2016 (JP) .................................. 2016-027535

(51) Int. Cl.
*H02P 25/22* (2006.01)
*H02P 27/08* (2006.01)
(Continued)

(52) U.S. Cl.
CPC ............... *H02P 25/22* (2013.01); *H02K 3/28* (2013.01); *H02M 7/53875* (2013.01);
(Continued)

(58) Field of Classification Search
None
See application file for complete search history.

(56) References Cited

U.S. PATENT DOCUMENTS 6,429,648 B1 8/2002 Nishimura
8,278,865 B2 * 10/2012 Shimada ................. H02P 27/04
318/503
(Continued)

FOREIGN PATENT DOCUMENTS

JP 2001-339989 A 12/2001
JP 2003-219692 A 7/2003
(Continued)

OTHER PUBLICATIONS

International Search Report dated Feb. 14, 2017, in PCT/JP2016/084585 filed Nov. 22, 2016.

*Primary Examiner* — Bickey Dhakal
(74) *Attorney, Agent, or Firm* — Xsensus LLP

(57) ABSTRACT

In order to reduce the number of current detectors detecting phase current in a power converting device that controls a power converter connected to a motor, thereby achieving a size reduction, the power converting device includes a current detector that detects, of winding groups of multi-phase windings, a total value of values of current flowing into a first switching element connected to a first phase of a first winding group and a second switching element connected to a second phase of a second winding group, and calculates a current value of another phase from current detected by the current detector.

12 Claims, 18 Drawing Sheets

(51) Int. Cl.
  *H02P 5/74*    (2006.01)
  *H02P 21/22*   (2016.01)
  *H02K 3/28*    (2006.01)
  *H02M 7/5387*  (2007.01)

(52) U.S. Cl.
  CPC ............... *H02P 5/74* (2013.01); *H02P 21/22*
          (2016.02); *H02P 27/08* (2013.01)

(56)         References Cited

U.S. PATENT DOCUMENTS

| | | | |
|---|---|---|---|
| 2004/0075406 A1* | 4/2004 | Nakai | H02P 25/22 |
| | | | 318/400.01 |
| 2010/0071970 A1 | 3/2010 | Welchko et al. | |
| 2014/0312809 A1* | 10/2014 | Ishida | H02P 25/22 |
| | | | 318/139 |
| 2015/0077025 A1 | 3/2015 | Suzuki | |
| 2017/0050668 A1 | 2/2017 | Kikuchi et al. | |
| 2019/0089288 A1* | 3/2019 | Koseki | H02P 29/0241 |

FOREIGN PATENT DOCUMENTS

| | | |
|---|---|---|
| JP | 2004-64836 A | 2/2004 |
| JP | 2007-252054 A | 9/2007 |
| JP | 2015-61379 A | 3/2015 |
| WO | WO 2015/141795 A1 | 9/2015 |

* cited by examiner

FIG. 6

| # | STATE | CONDITION | PROCESS |
|---|---|---|---|
| 1 | Vu* > Vv* > Vw* | Pmax > Vu* | THREE PHASE DETECTION |
|   |   | (Vu* > Pmax) & (Pmax > Vv*) | TWO PHASE DETECTION (Iv, Iw) $Iu = -Iv - Iw$ |
| 2 | Vu* > Vw* > Vv* | Pmax > Vu* | THREE PHASE DETECTION |
|   |   | (Vu* > Pmax) & (Pmax > Vw*) | TWO PHASE DETECTION (Iv, Iw) $Iu = -Iv - Iw$ |
| 3 | Vv* > Vu* > Vw* | Pmax > Vv* | THREE PHASE DETECTION |
|   |   | (Vv* > Pmax) & (Pmax > Vu*) | TWO PHASE DETECTION (Iu, Iw) $Iv = -Iu - Iw$ |
| 4 | Vv* > Vw* > Vu* | Pmax > Vv* | THREE PHASE DETECTION |
|   |   | (Vv* > Pmax) & (Pmax > Vw*) | TWO PHASE DETECTION (Iu, Iw) $Iv = -Iu - Iw$ |
| 5 | Vw* > Vu* > Vv* | Pmax > Vw* | THREE PHASE DETECTION |
|   |   | (Vw* > Pmax) & (Pmax > Vu*) | TWO PHASE DETECTION (Iu, Iv) $Iw = -Iv - Iu$ |
| 6 | Vw* > Vv* > Vu* | Pmax > Vw* | THREE PHASE DETECTION |
|   |   | (Vw* > Pmax) & (Pmax > Vv*) | TWO PHASE DETECTION (Iu, Iv) $Iw = -Iv - Iu$ |

POWER CONVERTING DEVICE

TECHNICAL FIELD

The present invention relates to a power converting device that carries out power conversion between direct current power and alternating current power using a multiple of switching elements, and in particular, relates to a power converting device that supplies power to a multi-phase winding alternating current motor.

BACKGROUND ART

In order to meet demands for noise reduction and vibration reduction in an alternating current motor, armature windings are such that two differing three-phase windings are wound by being multiplexed at a predetermined slot pitch, thereby obtaining a multiplex multi-phase winding alternating current motor, and torque pulsation is reduced fey energizing at a phase difference angle corresponding to the slot pitch, whereby a reduction of motor vibration and noise is carried out.

A power converting device that supplies power to the multiplexed multi-phase winding alternating current motor is such that a desired output voltage or a desired current is supplied using PWM (pulse width modulation) control.

For example, PWM control shown in Patent Document 1 is such that a multiple of power converters that supply power to each phase winding and a multiple of PWM control units that control the power converters are included, and PWM control is carried out so that, each PWM control unit executes a switching sequence such that a state wherein a power supply voltage is applied across the phase winding relating to the corresponding power converter, and a state wherein both ends of the phase winding are of the same potential and counter electromotive force of the winding is caused to reflux, can be adopted.

In particular, in order to reduce a ripple in current supplied to the alternating current motor, it is proposed that a phasal relationship of the switching sequences of the multiple of PWM control units is set so that a state wherein the counter electromotive force of each phase winding is caused to reflux does not occur immediately after a state wherein a voltage is applied to all of the phase windings, and a state wherein a voltage is applied to all of the phase windings does not occur immediately after a state wherein counter electromotive force is caused to reflux into all of the phase windings, in one switching cycle.

PWM control means shown in Patent Document 1 is configured so that a value of current flowing through the corresponding phase winding is detected, a deviation from a current command value is calculated, and a switching element is controlled based on a comparison of the deviation and a reference triangular wave. Further, a resistor is provided in order to detect current flowing through the switching element. However, there is no specific description of the resistor that detects the current.

In order to reduce size and weight of a power converting device, it is necessary to reduce the size and weight of each component, or to reduce the number of the component. Therefore, considering reduction of current detecting means as a precondition, a method of computing a duty command value whereby a shunt resistor for detecting current is connected to a direct current portion between a power converter and a direct current power supply negative side, a PWM control unit controls so that an effective voltage vector section in a first-half period and a second-half period in a predetermined multiple of cycles of a PWM signal is of a predetermined period or longer, a aero voltage vector section is equal to or greater than a minimum time determined from a short-circuit prevention period, and the zero voltage vector section is included in at least one of the first-half period and the second-half period, is disclosed in Patent Document 2.

CITATION LIST

Patent Literature

Patent Document 1: JP-A-2007-252054
Patent Document 2: JP-A-2015-061379

SUMMARY OF INVENTION

Technical Problem

The device proposed in Patent Document 1 is such that when a two-phase motor is a target, phases of the switching sequences controlling each phase winding are inverted, hut a configuration equivalent to a kind of power converter including six upper and lower arms that drives a three-phase alternating current motor is not a configuration that includes a carrier signal for each phase, provides phase differences of 120 degrees each, and carries out vector control such that drive's and controls by detecting current in each phase at the same timing, and there is a problem in that a three-phase alternating current motor cannot be driven.

Also, the device proposed in Patent Document 2 is such that two current detectors are needed in a direct current portion on a negative side of the power converter, and when detecting phase current from bus current, a voltage command restriction is large, and switching pulse correction may be needed depending on voltage command conditions, in which case there is a problem in that a higher harmonic appears in the current.

The invention, given that the previously described kinds of problem exist, has an object of providing a power converting device such that a stable supply of power is carried out, while current detectors that detect current supplied to multi-phase windings are reduced in order to reduce the size of a power converting device that supplies power to a multi-phase winding alternating current motor.

Solution to Problem

A power converting device according to the invention includes a power converter that supplies power to a multiple of multi-phase windings of an alternating current motor using a multiple of bridge-connected switching elements, and a power converter controller that generates a PWM signal that controls the power converter, wherein the power converter has a current detector connected to, of winding groups of the multi-phase windings, a first switching element connected to a first phase of a first winding group and a second switching element connected to a second phase of a second winding group, and detecting a total value of a value of current flowing into the first switching element and a value of current flowing into the second switching element, and the power converter controller is configured to control the first winding group using a first carrier signal, control the second winding group using a second carrier signal, and carry out current detection by causing a phase of the first carrier signal and a phase of the second carrier signal to deviate within a phase range wherein an on/off state of the first switching element connected to the current detectors differs from an on/off state of the second switching element connected to the current detectors, and generates the PWM signal in accordance with current detected by the current detector.

Advantageous Effects of Invention

The power converting device according to the invention is such that the number of current detectors provided in a switching element of each phase can be reduced, because of which a reduction in size and a reduction in weight of the power converting device can be realized.

BRIEF DESCRIPTION OF DRAWINGS

FIG. 6 is an illustration showing a relationship between three-phase voltage command conditions and detectable phase current according to the power converting device of the first embodiment of the invention.

DESCRIPTION OF EMBODIMENTS

First Embodiment

A first embodiment has as a target a power converting device that supplies power to a motor wherein two three-phase windings are disposed duplicated in one motor as a motor having multiple phases of windings. As a configuration detecting six phases of current using three current detectors in a power converter wherein a switching element is controlled so as to be turned on and off using PWM control, the power converting device includes a power converter control unit that carries out PWM control of the power converter switching element in accordance with a current value detected by the current detectors.

Hereafter, the first embodiment of the invention will be described based on FIG. 1, which is a system configuration diagram according to a power converting device, FIG. 2, which shows details of a carrier signal, a switching pulse, and a current detection timing, FIG. 3, which shows details of a first carrier signal with respect to a first group of windings and a switching pulse, a second carrier signal with respect to a second group of windings, and current detection timing when a motor wherein three-phase windings are duplicated is taken as a target, FIG. 4, which shows phases of three-phase, voltage commands of each group, FIG. 5, which shows amplitude of the three-phase voltage commands, and FIG. 6, which shows a relationship between magnitude conditions of the three-phase voltage commands and detected current.

Figure 1:
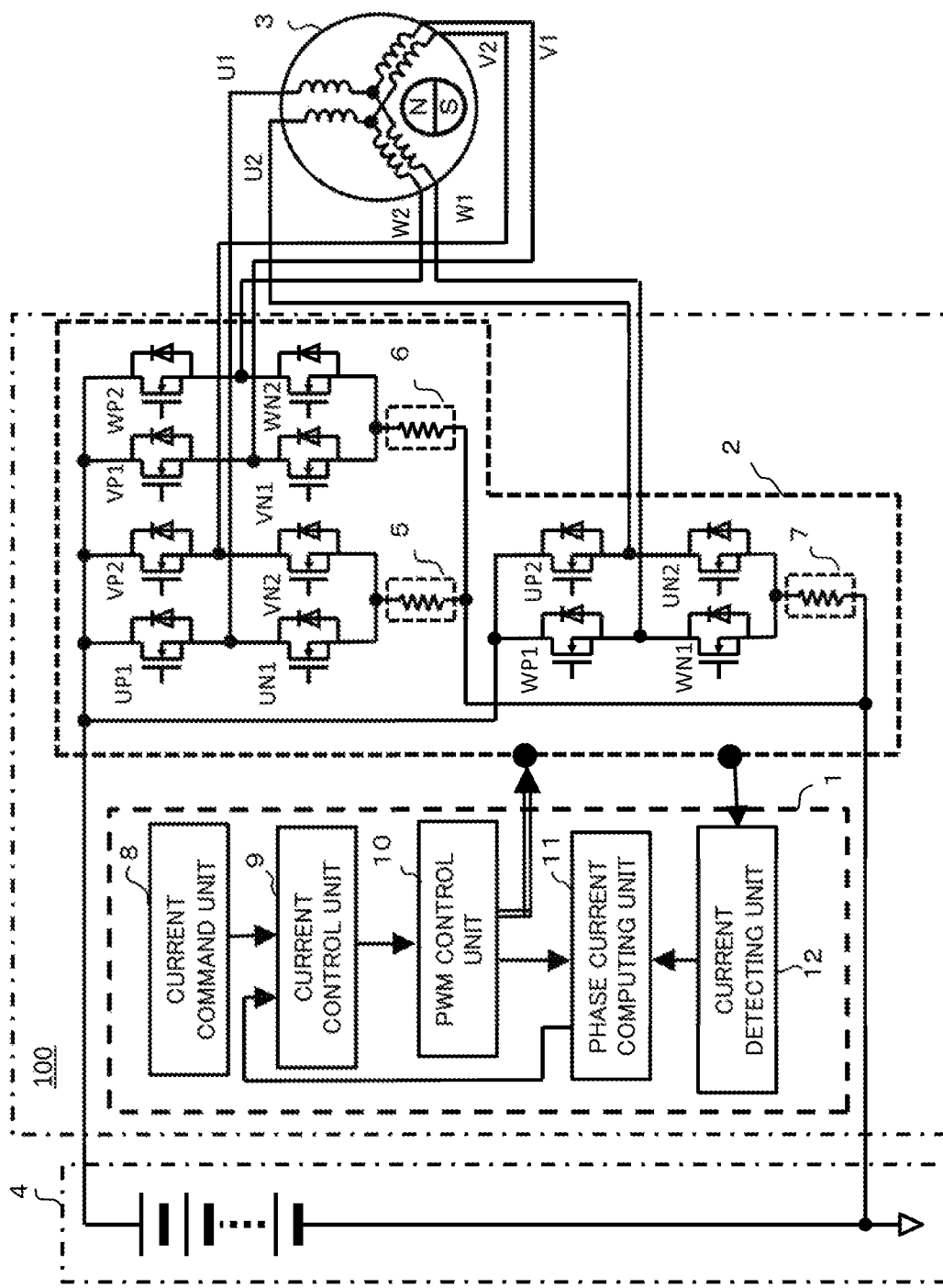
FIG. 1 is a system configuration diagram according to a power converting device of a first embodiment of the invention.

FIG. 1 shows a system configuration of a motor 3, a power converting device 100 that supplies power to the motor 3, and a direct current supply 4. The power converting device 100 includes a power converter 2 and a power converter control unit 1, wherein the power converter control unit 1 regulates power supplied to the motor 3 by controlling a switching element of the power converter 2, thereby driving and controlling the motor 3. The motor 3 being a synchronous motor that generates a rotor magnetic flux using a permanent magnet or a field winding, a three-phase alternating current motor is generally used. In the first embodiment, a motor having a rotor in which a permanent magnet is used is shown as an example, and three-phase windings are duplicated by being provided with a predetermined phase difference. In the motor 3, a first group of three-phase windings is taken to be U1, V1, and W1, and a second group of three-phase windings is taken to be U2, V2, and W2.

A torque command and a signal (electrical angle position signal) θe indicating a rotor magnetic pole position are input into the power converter control unit 1 from a higher level (an unshown exterior), and the power converter control unit 1 outputs a switching pulse that controls the power converter 2 based on the command value and the magnetic pole position signal θe.

The power converter 2 converts direct current power of the direct current supply 4 into alternating current power based on the switching pulse output by the power converter control unit 1, driving the motor 3 by applying alternating current voltage to each winding group of the motor 3. In the power converter 2, a current detecting resistor 5 that detects a total value of currents flowing into lower arms of the U-phase of the first group of three-phase windings and the V-phase of the second group of three-phase windings is provided as a current detector, a current detecting resistor 6 that detects a total value of currents flowing into lower arms of the V-phase of the first group of three-phase windings and the W-phase of the second group of three-phase windings is provided as a current detector, and a current detecting resistor 7 that detects a total value of currents flowing into lower arms of the W-phase of the first group of three-phase windings and the U-phase of the second group of three-phase windings is provided as a current detector.

The power converter control unit 1 includes a current command unit 8, a current control unit 9, a PWM control unit 10, a phase current computing unit 11, and a current detecting unit 12.

With regard to control of the motor 3, a method of controlling the first group of three-phase windings of the motor 3 winding groups and a method of controlling the second group of three-phase windings differ only in current detection timing, and voltage command calculation methods are the same, because of which only the method of controlling the first group of three-phase windings will be described here.

The current command unit 8 converts a torque command provided from a higher level (an unshown exterior) into a Current command expressed in d-q coordinates, which are a rotary coordinate system, and sends a d-axis current command id* and a q-axis current command iq* together with the magnetic pole position, signal θe to the current control unit 9 as a command value.

The current control unit 9 calculates three-phase voltage commands Vu*, Vv*, and Vw* based on the d-q coordinate system current, commands id* and iq* and the magnetic pole position signal θe provided from the current command unit 8 and three-phase current values iu, iv, and iw obtained in the phase current computing unit 11, and outputs the three-phase voltage commands Vu*, Vv*, and Vw* to the PWM control unit 10.

The PWM control unit 10 carries out a carrier comparison process on the three-phase voltage commands Vu*, Vv*, and Vw* from the current control unit 9 and a triangular carrier wave generated internally, and generates switching pulses that drive each switching element of the power converter 2. At this time, PWM control triangular carrier waves of the first and second Winding groups are controlled independently.

The phase current computing unit 11 is such that three-phase current values are output to the current control unit 9 based on current values from the current detecting unit 12, but when only two phases of current can be detected in the current detecting unit 12, the phase current computing unit 11 computes the remaining one phase of current, and outputs the three phases of current values iu, iv, and iw.

The current detecting unit 12 detects current values flowing through the current detecting resistors 5, 6, and 7 in the interior of the power converter 2 twice within one PWM control carrier cycle, in accordance with a carrier signal output timing of each group of the PWM control unit 10, and outputs the three-phase currents iu, iv, and iw of each group. When only two phases of current can be detected in accordance with magnitude conditions of a voltage command, output by the PWM control unit 10, the current detecting unit 12 does not output the remaining one phase of current.

Next, based on FIG. 1 to FIG. 6, an operation, of the power converting device 100 according to the first embodiment of the invention will be described.

In FIG. 1, the three-phase voltage commands Vu*, Vv*, and Vw* are calculated in the power converter control unit 1 from a torque command input from a higher level and the magnetic pole position signal θe. Configuring a current control loop using a value of a phase current between the power converter and the motor, and controlling the phase current so as to flow in accordance with a current command value, is common as a method of calculating the voltage commands Vu*, Vv*, and Vw*.

When considering control of an induction motor or a synchronous motor, control is generally carried out using d-q coordinates, which are a rotary coordinate system, rather than a three-phase alternating current coordinate system. A determinant that carries out conversion from a three-phase alternating current coordinate system to a d-q coordinate system is expressed as in Expression (1). In Expression (1), id is a current value expressed on a d-axis, and iq is a current value expressed on a q-axis.

[Math. 1]

$$i_d = \sqrt{\frac{2}{3}} \cdot \left[ i_u \cdot \cos\theta + i_v \cdot \cos\left(\theta - \frac{2}{3}\pi\right) + i_w \cdot \cos\left(\theta + \frac{2}{3}\pi\right) \right] \quad (1)$$

$$i_q = -\sqrt{\frac{2}{3}} \cdot \left[ i_u \cdot \sin\theta + i_v \cdot \sin\left(\theta - \frac{2}{3}\pi\right) + i_w \cdot \sin\left(\theta + \frac{2}{3}\pi\right) \right]$$

From Expression (1) id and iq can be obtained as the following Expression (2).

[Math. 2]

$$\begin{bmatrix} i_d \\ i_q \end{bmatrix} = \begin{bmatrix} \cos\theta & \sin\theta \\ -\sin\theta & \cos\theta \end{bmatrix} \cdot \sqrt{\frac{2}{3}} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} i_u \\ i_v \\ i_w \end{bmatrix} \quad (2)$$

In Expressions (1) and (2), a magnetic pole position signal θ indicates a direction of a d-axis magnetic pole position when a direction of a rotor field magnetic flux is the d-axis.

Also, when obtaining the remaining one phase of current from, two phases of current, from iw=−iu−iv or the like, conversion from the two phase currents to currents on the d-q axes can be carried out. The electrical angle magnetic pole position signal θe is used for θ used in computing coordinate conversion.

The current commands id* and iq* expressed by an orthogonal two-phase coordinate system are input from the current command unit 8 into the current control unit 9, and after the phase current values in, iv, and iw detected in the current detecting unit 12 are converted in the current control unit 9 into detected current values id and iq expressed by an orthogonal two-phase coordinate system, a current deviation is generated as command values vd* and vq* by a PI controller.

Furthermore, by coordinate conversion being carried out on the voltage commands vd* and vq* in accordance with the magnetic pole position signal θe the voltage commands vd* and vq* are converted into the three-phase voltage commands Vu*, Vv*, and Vw*, and output to the PWM control unit 10.

Generally, a coordinate conversion expression that converts from a two-phase d-q coordinate system to a u-v-w three-phase alternating current coordinate system is calculated as Expression (3).

[Math. 3]

$$\begin{bmatrix} v_u \\ v_v \\ v_w \end{bmatrix} = \sqrt{\frac{2}{3}} \cdot \begin{bmatrix} 1 & 0 \\ -\frac{1}{2} & \frac{\sqrt{3}}{2} \\ -\frac{1}{2} & -\frac{\sqrt{3}}{2} \end{bmatrix} \cdot \begin{bmatrix} \cos\theta & -\sin\theta \\ \sin\theta & \cos\theta \end{bmatrix} \cdot \begin{bmatrix} v_d \\ v_q \end{bmatrix} \quad (3)$$

The current control unit 9 outputs the three-phase voltage commands Vu*, Vv*, and Vw* in this way.

The three-phase voltage commands Vu*, Vv*, and Vw* obtained in this way are converted by PWM control into switching pulses that control the switching elements of the power converter 2, and the switching elements, of the power converter 2 are controlled after an upper and lower arts short-circuit prevention time is added.

The current detecting unit 12 detects current by sampling the currents flowing through the current, detecting resistors 5, 6, and 7 in accordance with the timing of the carrier signal used in the PWM processing in the PWM control unit 10. Low-cost shunt resistors are commonly used as the current detecting resistors 5, 6, and 7. When using shunt resistors as the current detecting resistors 5, 6, and 7, one side of the shunt resistor is connected to the negative side of the power converter 2, because of which no insulating process is necessary.

Figure 2:
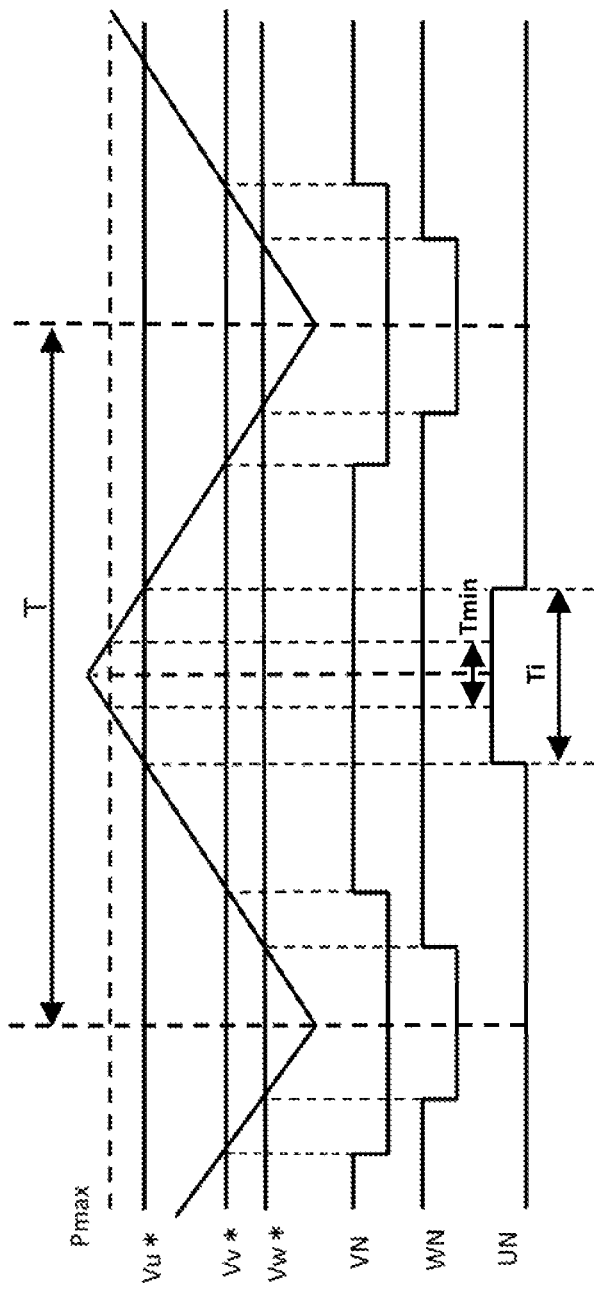
FIG. 2 is an illustration of a timing chart of a carrier signal and phase current detection according to the power converting device of the first embodiment of the invention.

FIG. 2 is a timing chart representing an example of the switching pulse of each of the three phases of voltage commands Vu*, Vv*, and Vw* and current detection timing when detecting current using the current detecting resistors 5, 6, and 7 connected to lower arms of the power converter 2. Switching pulses UN, VN, and WN represent control signals of a lower arm switching element group of the power converter 2. When trough to trough of a carrier signal C is defined as one carrier cycle T of PWM control, and a maximum voltage command value is taken to be a value smaller than 1.0 (100%), the voltage commands of all phases are smaller than the carrier signal at a point of a crest of the carrier signal C, and the switching elements in all lower arm phases are in an on-state for a certain period. At this timing, provided that the currents flowing into the lower arm switching element group are detected by the current detecting resistors 5, 6, and 7, three phases of current can be detected.

In order to detect current, it is necessary to secure a current detection period of or greater than a certain length (Tmin) needed for an AD conversion time or the like. FIG. 2 is an example, wherein Vu*>Vv*>Vw*, but provided that the maximum voltage command Vu* is smaller than a maximum voltage command value Pmax for causing current to flow through the lower arm, a current detection period of or greater than Tmin can be secured for all three phases. Consequently, by limiting the maximum value of the three phases of voltage commands, a current detection period Ti in which phase currents flowing into the lower arms are all detected can be generated.

Also, when using a condition such that the sum of the three phases of current is zero, two phases of current can be detected provided that the intermediate voltage command Vv* is smaller than the maximum voltage command value Pmax, and the remaining one phase of current can be obtained by calculation. Consequently, by limiting the maximum value and the intermediate value of the three phases of voltage commands, three phases of current can be obtained within one carrier cycle T.

Figure 3:
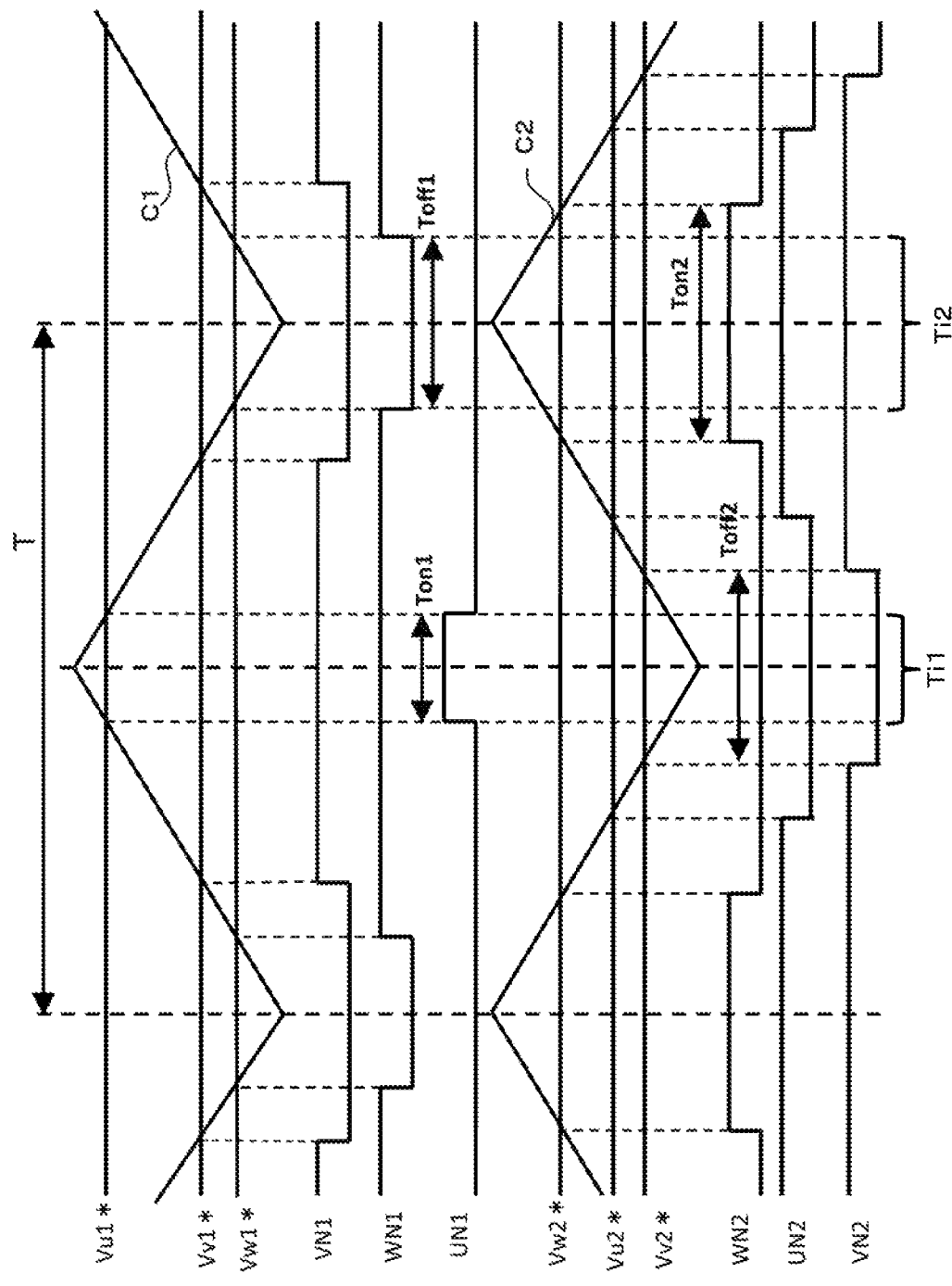
FIG. 3 is an illustration of a timing chart of a carrier signal of each group and phase current detection according to the power converting device of the first embodiment of the invention.

FIG. 3 is a diagram showing a timing chart when detecting current using the current detecting resistors 5, 6, and 7 connected to the lower arms of the power converter 2, with the motor 3 wherein three-phase windings are duplicated as a target of the invention, and represents the switching pulses of each of the first group of three-phase windings and the second group of three-phase windings and current detection timing.

Switching pulses UN1, VN1, and WN1 represent signals that control a lower arm switching element group driving the first group of windings of the power converter 2, and switching pulses UN2, VN2, and WN2 represent signals that control a lower arm switching element group driving the second group of windings of the power converter 2. PWM control is such that amplitudes of a triangular wave carrier signal and the three phases of voltage commands Vu*, Vv*, and Vw* are compared, and converted into six switching pulses UP, UN, VP, VN, WP, and WN.

When the maximum voltage command value is 1.0 or less and not in an overmodulated state, the lower am switching elements of all three phases are in an on-state, at a timing of a crest of a carrier signal C1 of the first group of three-phase windings in a vicinity of an exact center of the carrier cycle, and at this time, the currents in all phases of the first group of three-phase windings flow into the current detecting resistors 5, 6, and 7. Meanwhile, the lower arm switching elements of all phases of the first group of three-phase windings are in an off-state at a timing of a trough of the carrier signal C1 of the first group, and current does not flow into the current detecting resistors 5, 6, or in any phase. As shown in FIG. 3, a time Ton1 at which the currents in all three phases of the first group of three-phase windings flow into the lower arm occurs, and provided that the minimum voltage command value is equal to or greater than a predetermined voltage, a time Toff1 at which none of the currents in the three phases of the first group of three-phase windings flows into the lower arm occurs.

Meanwhile, in the same way as with the first group of three-phase windings, the three phases of current of the second group of three-phase windings also switch in the same way to an on-state and an off-state at a crest and trough of a carrier signal C2 of the second group when the maximum voltage command value of the second group of three-phase windings is 1.0 or less. Consequently, a time Ton2 at which the currents in all three phases of the second group of three-phase windings flow into the lower arm occurs f and provided that the minimum voltage command value is equal to or greater than a predetermined voltage, a time Toff2 at which none of the currents in the three phases of the second group of three-phase windings flows into the lower arm occurs.

As a result of this, by causing the phases of the carrier signal C1 of the first group of three-phase windings and the carrier signal C2 of the second group of three-phase windings to deviate relatively by 180 degrees, and controlling so that the timing of a crest of the carrier signal of one group of three-phase windings and the timing of a trough of the carrier signal of the other group of three-phase windings occur simultaneously, a state wherein only the current of each group of three-phase windings flows into the current detecting resistors 5, 6, and 7 can be caused to occur once each within the carrier cycle.

A period of Ton2 of the second group of three-phase windings and a period of Toff1 of the first group of three-phase windings coincide, but even in the Ton2 period, the currents of both groups flow into the current detecting resistors in a period that is not Toff1, because of which current detection cannot be carried out. Consequently, a period Ti2 in which the current of the second group can be detected in this example is Toff1.

In the same way, a relationship between a period of Ton1 of the first group and a period of Toff2 of the second group is such that the currents of both groups flow into the current detecting resistors in a period that is not Toff2, because of which current detection cannot be carried out even in the Ton1 period. Consequently, a period Ti1 in which the current of the first group can be detected in this example is Ton1, because of which each current detection needs to be carried out within a shortish period between Ton1 and Toff2, or between Ton2 and Toff1.

Also, the phase of the carrier signal C1 of the first group of three-phase windings and the phase of the carrier signal C2 of the second group of three-phase windings may deviate by ±180 (whichever is smaller of |Ton1−Toff2|/2/(Tc/2)*180 and |Toff1−Ton2|/2/(Tc/2)*180 degrees. That is, the phase of the carrier signal C1 of the first group of three-phase windings and the phase of the carrier signal C2 of the second group of three-phase windings may deviate within a phase range in which an on/off-state of one switching element on one current, detecting resistor side differs from an on/off-state of another switching element on the same current detecting resistor side. In a phase in this range, the currents of both groups of three-phase windings do not flow into the same current detecting resistor simultaneously, because of which current can be detected.

Figure 4:
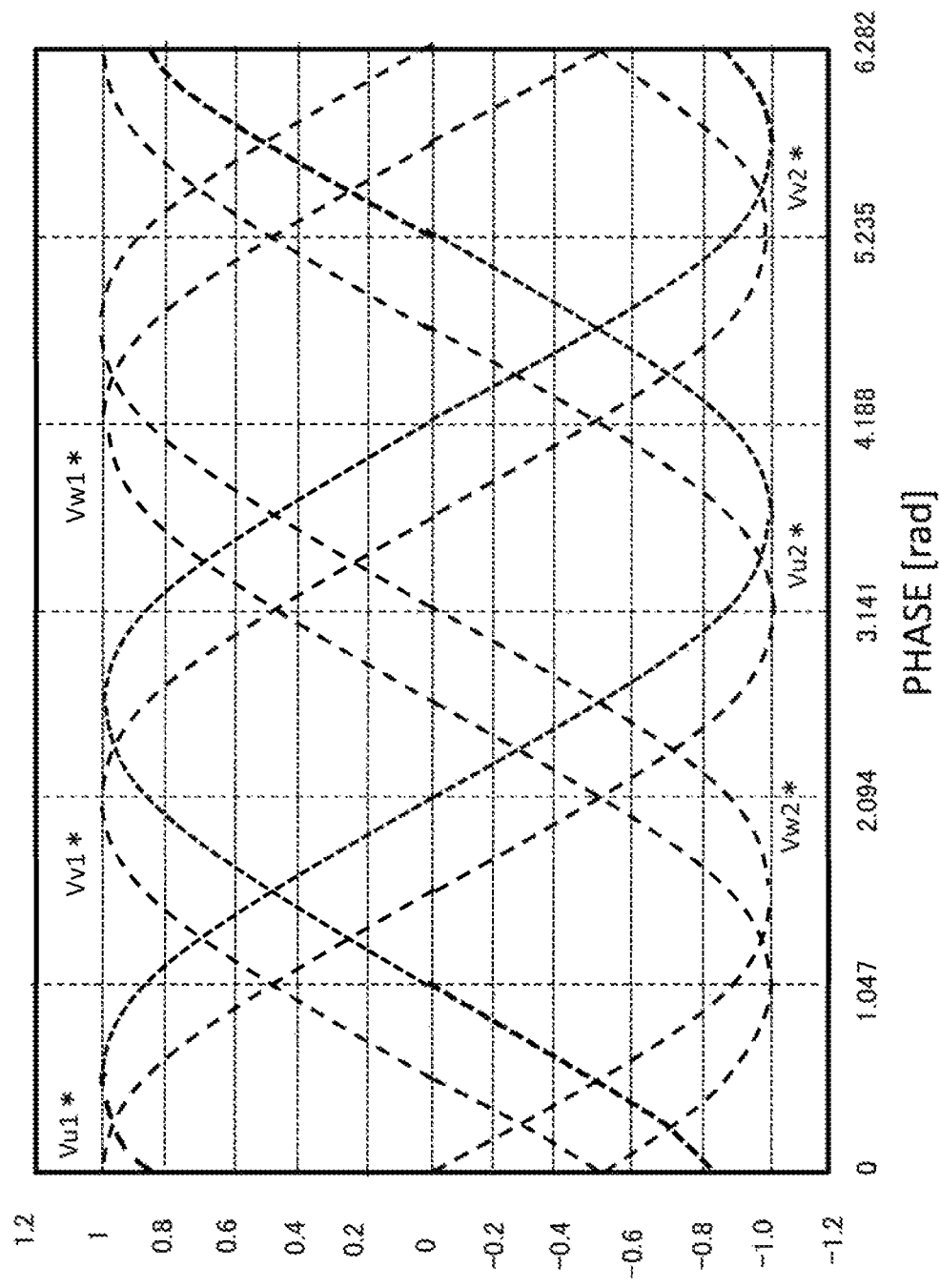
FIG. 4 is an illustration of a voltage command phase of each group according to the power converting device of the first embodiment of the invention.

FIG. 4 is a diagram showing a phasal relationship between voltage commands of the first group and the second group of three-phase windings, and is an example in which an electrical phase difference between the first group of windings and the second group of windings is 30 degrees (although a phase difference of 30 degrees is desirable in order to reduce a 6 f component of torque ripple, the phase difference may also be a phase difference in a range of 20 degrees to 40 degrees).

In a vicinity of a phase in which the U-phase voltage of the first group of three-phase windings reaches a maximum value, the V-phase voltage of the second group of three-phase windings is lowest.

Also, in a vicinity of a phase in which the V-phase voltage of the first group of three-phase windings reaches a maximum value, the W-phase voltage of the second group of three-phase windings is lowest, and in a vicinity of a phase in which the W-phase voltage of the first group of three-phase windings reaches a maximum value, the U-phase voltage of the second group of three-phase windings is lowest.

The current flowing into the current detecting resistors 5, 6, and 7 is alternately switched by group within the carrier cycle, because of which, provided that a combination of two detected phase currents is such that phases wherein the voltage of one group is in the vicinity of a maximum while the voltage of the other group is low are combined, a time for which the switching elements of both groups are in an on-state can be reduced. In this case, it is sufficient that the phase of one phase of the voltage command of one group and the phase of one phase of the voltage command of the other group deviate by a phase in a range of 180 degrees to 210 degrees.

That is, provided that a combination such that the lengths of the Ton period of one group and the Toff period of the other group are near is selected, neither a state wherein the total current of two phases flows nor a state wherein the current of neither phase flows continues for a long time, and a state wherein one phase's worth of current constantly flows into the current detecting resistors 5, 6, and 7 can be maintained. As a result of this, heat generated by the current detecting resistors 5, 6, and 7, switching element switching loss, and the like, is restricted, and the first group and second group of phase currents can be detected with good balance.

Figure 5:
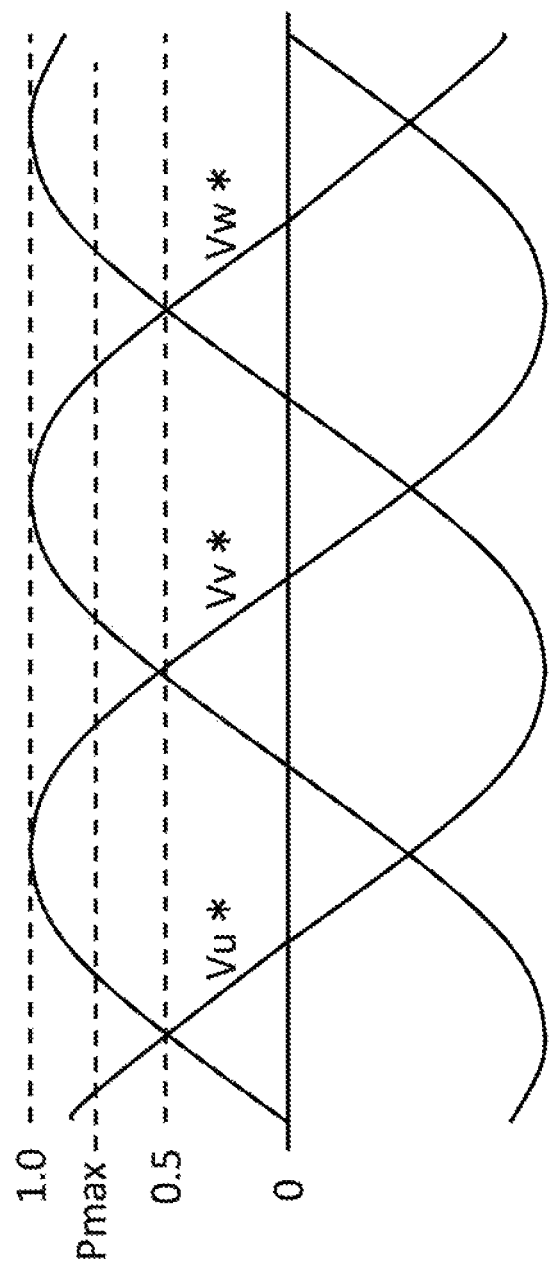
FIG. 5 is an illustration of voltage command amplitude of each group according to the power converting device of the first embodiment of the invention.

FIG. 5 shows that the maximum value of the intermediate value of the three phases of voltage, commands $Vu^*$, $Vv^*$, and $Vw^*$ is 0.5. When the peak voltage command value is exactly ±1.0, the maximum intermediate voltage command value is 0.5. Taking Pmax for generating a current detection period to be in the region of 0.8, at least two phases of current detection are established provided that the maximum voltage of the three phases of voltage is not 1.6 or greater. Consequently, when operating within a normal voltage command value range, two phases of current can be stably detected.

FIG. 6 shows a relationship between the magnitude relationship of the three phases of voltage commands $Vu^*$, $Vv^*$, and $Vw^*$ and phase current detectable at the time.

Condition 1 is a case in which $Vu^*>Vv^*>Vw^*$, and when Pmax>$Vu^*$, all three phases of current can be detected. Also, when $Vu^*$>Pmax and Pmax>$Vv^*$, two phases of current can be detected. When the intermediate voltage command exceeds Pmax, the maximum Voltage command is in an overmodulated state of 1.6 or greater. FIG. 6 also shows a case in which all three phases of current can be detected and a case in which two phases of current can be detected for conditions 2, 3, 4, 5, and 6.

In the first embodiment, a description has been given with a three-phase alternating current synchronous motor as an example, but a motor forming a target of the invention may be any motor, such as an induction motor. Also, the current detecting resistors 5, 6, and 7 of the invention, rather than being shunt resistors, may be other current detectors, such as current detectors in which Hall elements are used. Also, voltage command calculation of the invention is such that calculation is carried out using magnetic pole position information from a position sensor, but V/f control or the like, in which magnetic pole position information is not used, may be applied. In this case, a detected phase current value can be used in another application, such as over current prevention. Also, current detected in the power converter of the invention is such that a combination of a phase of the first group of three-phase windings and a phase of the second group of three-phase windings need not be the combination shown in the embodiment. For example, current detection can be carried out in the same way by combining differing phases, such as the U-phase of the first group of three-phase windings and the W-phase of the second group of three-phase windings.

As heretofore described, the power converting device 100 according to the first embodiment includes the power converter 2 wherein a multiple of winding groups of three phases or more are connected by being multiplexed, the current detecting resistors 5, 6, and 7 that, two phases of the multiplexed winding groups, those being one specific phase and another specific phase, being combined, detect the total current of the two phases, and the PWM control unit 10 that computes a voltage command to be provided to the power converter 2 based on the current detected by the current detecting resistors 5, 6, and 7, and generates a PWM signal for controlling the multiple of switching elements so as to be turned on and off based on the voltage command, because of which there are advantages in that the number of current detecting resistors can be reduced, whereby the size of the power converting device can be reduced, current can be detected accurately with a low-cost configuration, and the motor can be stably controlled.

Second Embodiment

A power converting device 101 according to a second embodiment is of a configuration that controls a motor 13 having a field winding in a rotor. Hereafter, based on FIG. 7, the second embodiment of the invention will be described.

Figure 7:
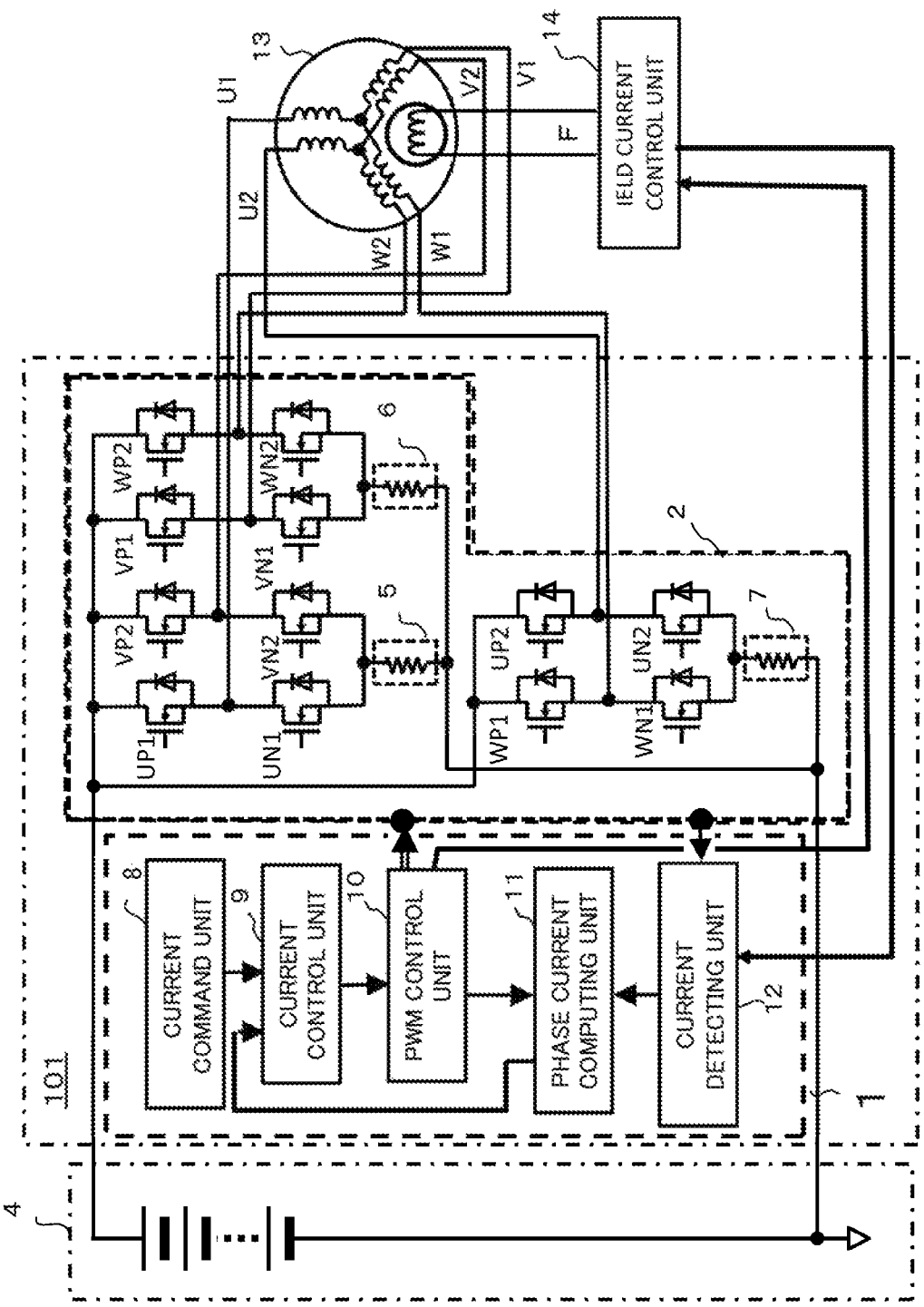
FIG. 7 is a system configuration diagram according to a power converting device of a second embodiment of the invention.

FIG. 7 represents a system configuration of the motor 13, the direct current supply 4, and the power converting device 101, wherein the same reference signs are allotted to portions identical to or corresponding to portions of FIG. 1. Differing from the first embodiment, FIG. 7 shows a system configuration including a field current control unit 14 that controls current flowing into the rotor field winding of the motor 13.

The field current control unit 14 is for controlling current flowing into the field winding of the wound field motor 13, and is configured so as to be able to control torque or induction voltage by regulating rotor field current. Also, terminal voltage generated on a stator side can be controlled using field current control.

In the second embodiment, a configuration is such that under a condition wherein a maximum voltage of three-phase voltage commands is high and the current detection period Ti in a carrier cycle is insufficient, the three-phase voltage commands are controlled so as to be low by the field current being kept low by the field current control unit 14, and the current detection period Ti is controlled so as to be of a length equal to or greater than a minimum current detection period.

That is, in the PWM control unit 10 of the power converter control unit 1, control is carried out so that at least two phases of current flow into the current detectors in one cycle by the field current control unit 14 being controlled and current flowing into the field winding being restricted.

The field current control unit 14 has various control methods, such as a method whereby field current detected in a field current detector (not shown) in an interior is subjected to feedback control, or a method whereby control is carried out so that an approximate current value is reached by a predetermined voltage being applied to the field winding.

As heretofore described, the power converter control unit 1 according to the second embodiment is of a configuration that controls the motor 13 having a field winding, wherein current detection is carried out with a low-cost configuration, in the same way as in the first embodiment, and the configuration is such that reliable current detection can be carried out at timings of carrier signal crests and troughs, because of which there is an advantage in that the motor 13 can be stably controlled.

Third Embodiment

A power converting device 102 according to a third embodiment is of a configuration that controls two independent motors 15 and 16. Hereafter, the third embodiment of the invention will be described, with a system configuration diagram according to the power converter control unit 1 of the power converting device 102 shown in FIG. 8.

Figure 8:
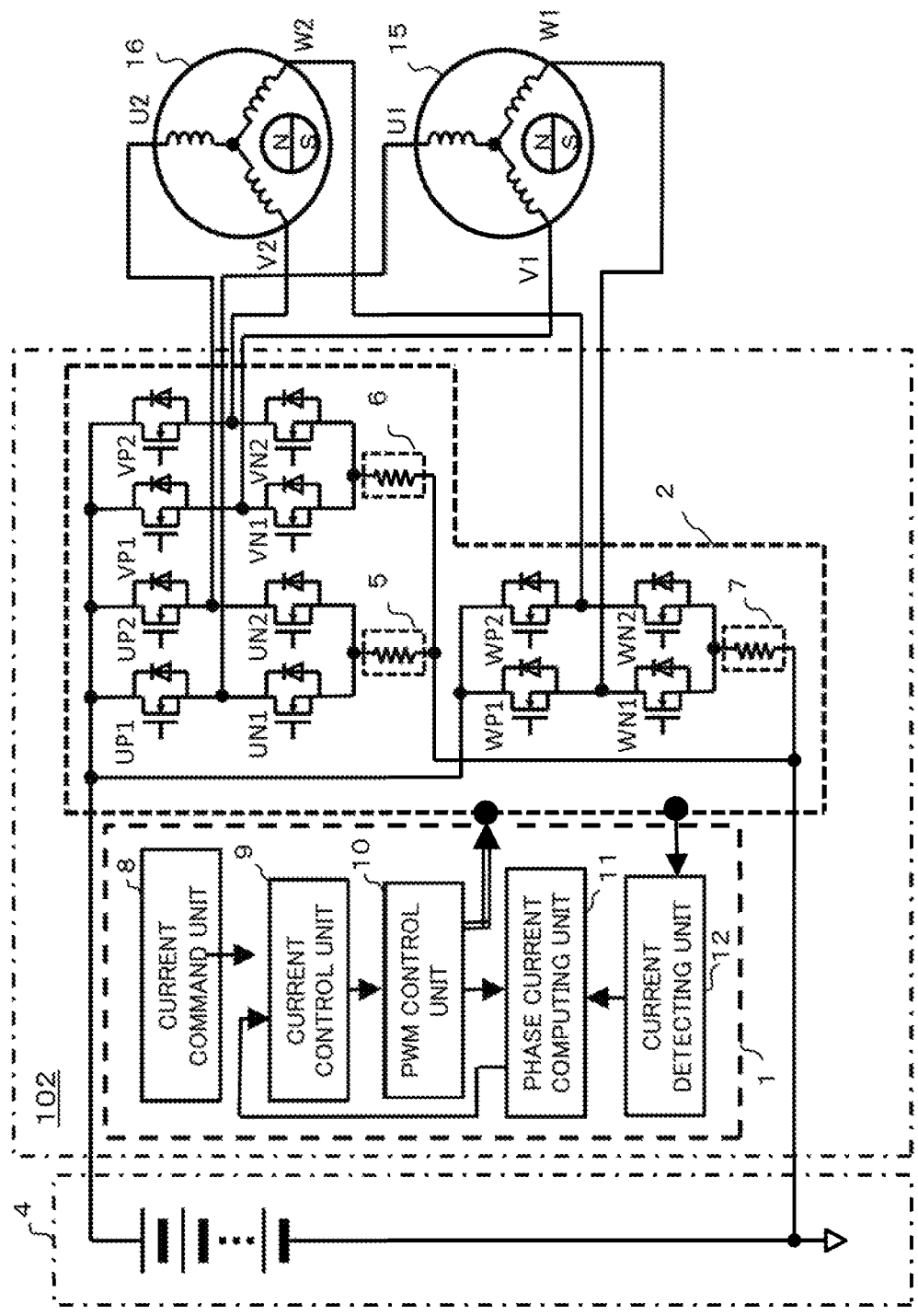
FIG. 8 is a system configuration diagram according to a power converting device of a third embodiment of the invention.

In FIG. 8, the same reference signs are allotted to portions identical to or corresponding to portions of FIG. 1. FIG. 8, differing from the first embodiment, shows a system configuration of the power converting device 102 including the power converter control unit 1, which controls the two independent motors 15 and 16. According to the third embodiment, the two completely independent motors 15 and 16 can be driven and controlled using one power converter control unit 1.

The power converter control unit 1 is configured of the current command unit 8, the current control unit 9, the PWM control unit 10, the phase current computing unit 11, and the current detecting unit 12. The current control unit 9 controls currents of the motors 15 and 16, calculates three-phase voltage commands Vu1*, Vv1*, Vw1*, Vu2*, Vv2*, and Vw2* based on current commands id1*, iq1*, id2*, and iq2* of each group of a d-q coordinate system provided from the current command unit 8, magnetic pole position signals θe1 and θe2 of each group, and three-phase current values iu1, iv1, iw1, iu2, iv2, and iw2 of each group obtained in the phase current computing unit 11, and outputs the three-phase voltage commands Vu1*, Vw1*, Vu2*, Vv2*, and Vw2* to the PWM control unit 10.

Differences of the current control unit 9 from the first embodiment are that two magnetic pole position signals θe1 and θe2 are input, and that two voltage commands are calculated. When rotary shafts of the motor 15 and the motor 16 are independent, two position sensors are included. Because of this, in order to control the two completely independent motors 15 and 16, a voltage command of each is calculated from two three-phase current values and magnetic pole position signals.

When driving the two motors 15 and 16, the phase difference of the voltage commands is not always constant unless rotor shafts of the two are mechanically joined, because of which there is no option other than to detect current by combining arbitrarily selected phases, but when the rotor shafts are joined, selecting so as to carry out current detection with a combination such that the phase difference of the two phases of voltage commands is in the vicinity of 180° is effective. In the example of FIG. 8, a configuration such that the same phases of current are detected is adopted as an example wherein the rotor shafts of the two motors 15 and 16 are not joined.

As heretofore described, the power converting device 102 according to the third embodiment is of a configuration having the two independent motors 15 and 16 including three-phase windings as control targets, but in the same way as in the first embodiment, there are advantages in that a system that drives a multiple of motors can be constructed at low cost, and the motors can be stably controlled.

Fourth Embodiment

A power converting device 103 according to a fourth embodiment is of a configuration that includes current detectors 19, 20, and 21 on the positive power supply 4 side of upper arm switching elements of the power converter 2, thereby controlling the motor 3. Hereafter, the fourth embodiment of the invention will be described based on FIG. 9, which is a system configuration diagram according to the power converting device 103.

Figure 9:
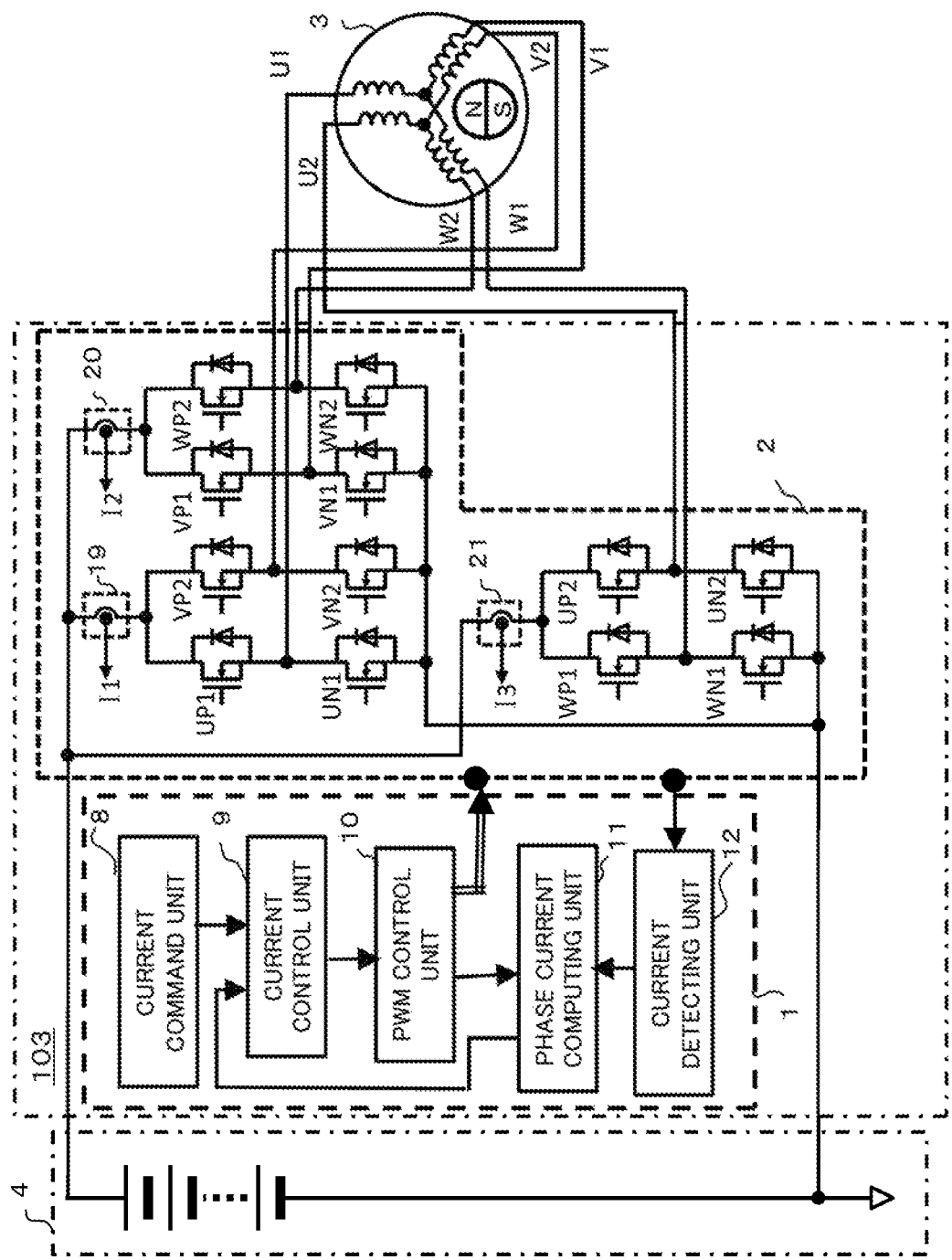
FIG. 9 is a system configuration diagram according to a power converting device of a fourth embodiment of the invention.

In FIG. 9, the same reference signs are allotted to portions identical to or corresponding to portions of FIG. 1. FIG. 3, differing from the first embodiment, shows a system configuration of the power converting device 103 including the current detectors 19, 20, and 21 on the positive power supply side of the upper arm switching elements of the power converter 2, and including the power converter control unit 1, which detects current.

The power converter 2 converts direct current power of the direct current supply 4 into alternating current power based on the switching pulse output by the power converter control unit 1, driving the motor 3 by applying alternating current, voltage to each winding group of the motor 3. A current detector 19 that detects a total value of currents flowing into upper arms of the U-phase of the first group and the V-phase of the second group, a current detector 20 that detects a total value of currents flowing into upper arms of the V-phase of the first group and the w-phase of the second group, and a current detector 21 that detects a total value of currents flowing into lower arms of the W-phase of the first group and the U-phase of the second group, are included in the power converter 2.

The current detectors 19, 20, and 21 of the invention, differing from the current detecting resistors 5, 6, and 7 shown in the first embodiment, are inserted in the upper arras of the power converter 2, because of which insulated Hall elements or the like are used.

The power converter control unit 1 is configured of the current command unit 8, the current control unit 9, the PWM control unit 10, the phase current computing unit 11, and the current detecting unit 12.

The current detecting unit 12 detects current values 11, 12, and 13 flowing through the current detecting resistors 13, 20, and 21 in the interior of the power converter 2 twice within one PWM control carrier cycle, in accordance with a carrier signal output timing of each group of the PWM control unit 10, outputs the three-phase currents, iu, iv, and iw of each group, and carries out a voltage command computation, in the same way as in the first embodiment.

Figure 10:
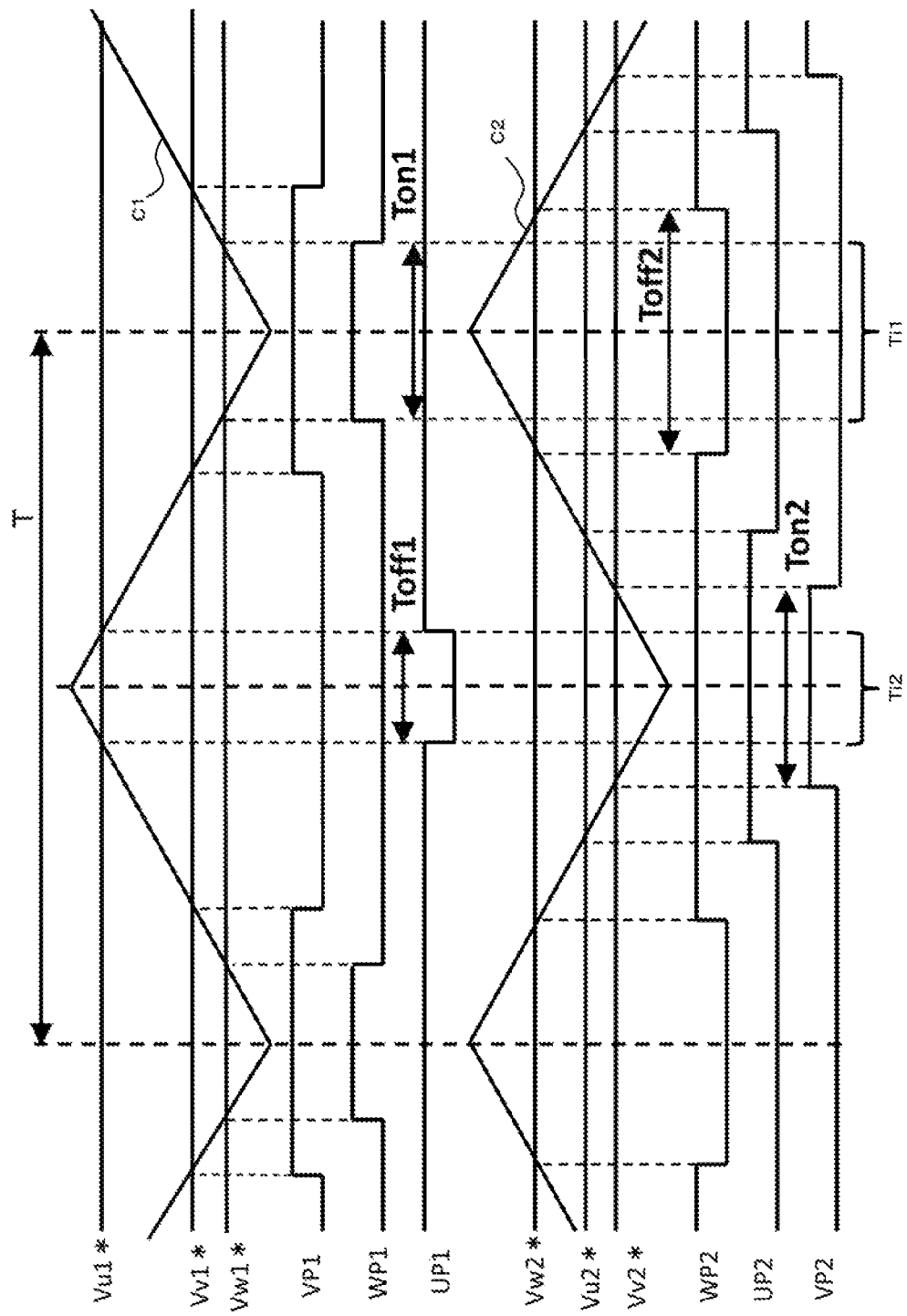
FIG. 10 is an illustration of a timing chart of a carrier signal of each group and phase current detection according to the power converting device of the fourth embodiment of the invention.

FIG. 10 is a timing chart representing switching pulses of the first group and the second group and current detection timing when detecting current using the current detectors 19, 20, and 21 connected to the upper arms. Switching pulses UP1, VP1, and WP1 represent signals controlling an upper arm switching element group that drives the first group of windings of the power converter 2, and switching pulses UP2, VP2, and WP2 represent signals controlling an upper arm switching element group that drives the second group of windings of the power converter 2.

When the maximum voltage command value is 1.0 or less and not in an overmodulated state, the upper arm switching elements of all three phases are in an off-state at a timing of a crest of the carrier signal C1 of the first group, which is in a vicinity of an exact center of the carrier cycle T, and at this time, current does not flow into the current detectors 19, 20, or 21 in any phase of the first group.

Meanwhile, the upper arm switching elements of all phases of the first group are in an on-state at a point of a trough of the carrier signal C1, and the currents of all phases flow into the current detectors 19, 20, and 21. The time Ton1 at which all three phases of currents of the first group flow into the upper arm exists, and provided that the maximum voltage command value is equal to or smaller than a predetermined voltage command, the time Toff1 at which none of the three phases of currents of the first group flows into the upper arm exists.

Meanwhile, in the same way as with the first group, the three phases of current of the second group also switch in the same way to an on-state and an off-state at a crest and trough of the carrier signal C2 of the second group when the maximum voltage command value of the second group is 1.0 or less. Consequently, the time Ton2 at which all three phases of currents of the second group flow into the upper arm exists, and provided that the minimum voltage command value is equal to or greater than a predetermined voltage command, the time Toff2 at which none of the three phases of currents of the second group flows into the upper arm exists.

As a result of this, in the same way as in the first embodiment, by controlling the carrier signal C1 so as to deviate by 180° from the phase of the carrier signal C2 of the second group, and controlling so that the timing of a crest of one group and the timing of a trough of the other group occur simultaneously, a state wherein only the current of the one group flows into the current detectors 19, 20, and 21 can be generated.

A period of Ton2 of the second group, and a period of Toff1 of the first group coincide, but even in the Ton2 period, the currents of both groups flow into the current detecting resistors in a period that is not Toff2, because of which current detection cannot be carried out. Consequently, the period Ti in which current can be detected at this time is Toff1.

In the same way, a relationship between a period of Ton1 of the first group and a period of Toff2 of the second group is such that the currents of both groups flow into the current detectors in a period that is not Toff2, because of which current detection cannot be carried out even in the Ton1 period. Consequently, current detection needs to be carried out within a shortish period between Ton1 and Toff2, or between Ton2 and Toff1.

In the same way as in the embodiments thus far, it is necessary to cause current to flow into the upper arms for a certain period within the carrier cycle, because of which a limit to the maximum voltage command value occurs, but when one of the three phases of current cannot be detected, two phases of current are detected, and the remaining one phase can be obtained by calculation.

As heretofore described, the power converting device 103 according to the fourth embodiment is configured of current detectors that, two phases of multiplexed winding groups, those being one specific phase and another specific phase, being combined, detect the total current of the two phases flowing to the positive side of the switching elements, and a PWM signal control unit that computes a voltage command to be provided to the power converter based on the current detected by the current detectors, and generates a PWM signal for controlling the multiple of switching elements so as to be turned on and off based on the voltage command, because of which there are advantages in that current can be detected accurately with a low-cost configuration, and the motor can be stably controlled.

Fifth Embodiment

A power converting device according to a fifth embodiment is of a configuration that controls a direct current power supply voltage. In the fifth embodiment, under a condition wherein a maximum voltage of three-phase voltage commands is high and the current detection period Ti in a carrier cycle is insufficient, a modulation rate of the three-phase voltage commands is controlled so as to be low by raising the direct current power supply voltage, and the current detection period Ti is controlled so as to be of a length equal to or greater than a minimum current detection period.

As heretofore described, the power converting device according to the fifth embodiment is of a configuration that controls a direct current power supply voltage, and in the same way as in the first embodiment, current detection can be carried out with a configuration such that current detectors are reduced owing to at least two phases of current flowing into the same current detector, and the configuration is such that reliable current detection can be carried out at timings of carrier signal crests and troughs, because of which there is an advantage in that the motor can be stably controlled.

Sixth Embodiment

A power converting device 104 according to a sixth embodiment is of a configuration that controls the motor 3 using a power module in which a multiple of switching elements are incorporated. Herein, the power converting device 104 is configured using a module in which two switching elements are incorporated, and in which no resistor for current detection is incorporated. Hereafter, the sixth embodiment of the invention will be described based on FIG. 11, which is a system configuration diagram according to the power converting device 104.

Figure 11:
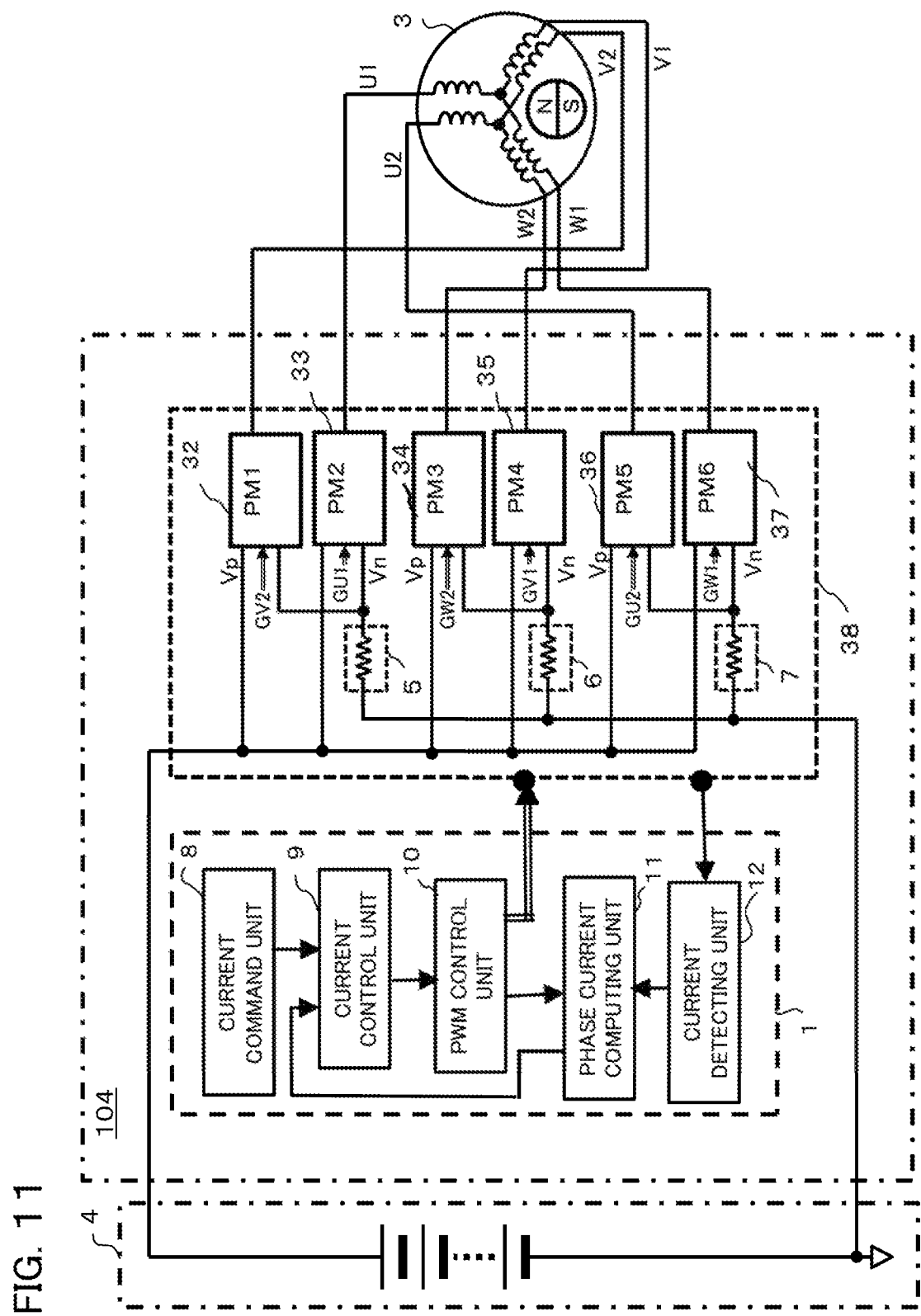
FIG. 11 is a system configuration diagram according to a power converting device of a sixth embodiment of the invention.

In FIG. 11, the same reference signs are allotted to portions identical to or corresponding to portions of FIG. 1. FIG. 11, differing from the first embodiment, shows a system configuration of the power converting device 104 including the power converter control unit 1, which carries out a switching operation of a power converter 38 configured of six power modules 32, 33, 34, 35, 36, and 37, and detects phase current using the current detectors 5, 6, and 7.

In the sixth embodiment, a resistor (current detector) for current detection is connected to a module exterior, and the current defecting unit 12 detects the current values I1, I2, and I3 flowing through the current detectors 5, 6, and 7 in an interior of the power converter 38 twice within one PWM control carrier cycle, in accordance with a carrier signal output timing of each group of the PWM control unit 10, outputs the three-phase currents iu, iv, and iw of each group, and carries out a voltage command computation, in the same way as in the first embodiment.

The three-phase voltage commands are converted by PWM processing into gate signals GU1, GV1, GW1, GU2, GV2, and GW3 in the PWM control unit 10, and output to the power converter 38, thereby driving the six power modules 32, 33, 34, 35, 36, and 37 configuring the power converter 38.

Figure 12:
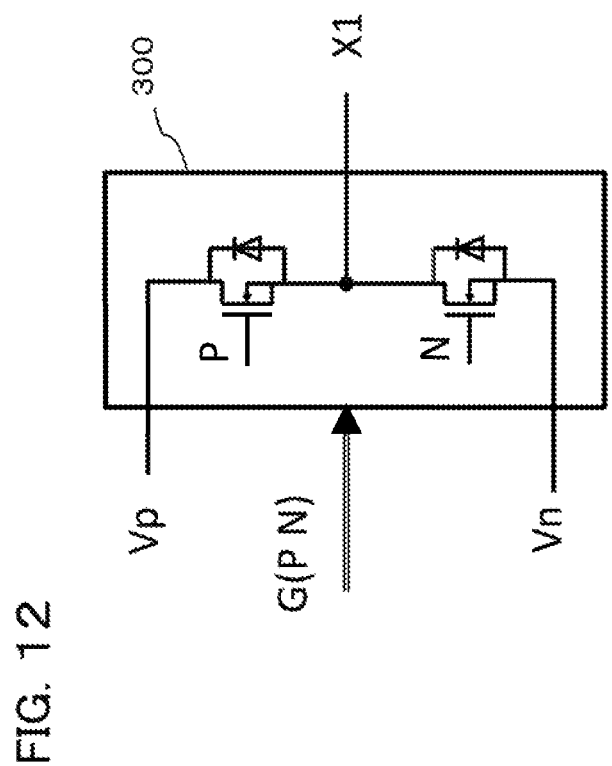
FIG. 12 is a module diagram for realizing the sixth embodiment of the invention.

FIG. 12 is a diagram representing an internal configuration of the power modules 32, 33, 34, 35, 36, and 37. Two switching elements are incorporated in a module 300, a positive side voltage Vp and a negative side voltage Vn of a direct current power supply are connected, and the switching elements are driven so as to be turned on and off by a P-side element gate signal P and an N-side element gate signal N, and output a voltage X1 for driving a motor.

As heretofore described, the power converting device according to the sixth embodiment is of a configuration that controls using a module in which switching elements are incorporated, and configures the same kind of control as in the first embodiment with fewer pares, because of which the motor can be controlled at low cost.

Seventh Embodiment

A power converting device 105 according to a seventh embodiment is of a configuration that controls the motor 3 using a power module in which a multiple of switching elements are incorporated, in the same way as in the sixth embodiment. Herein, the power converting device 105 is configured using a module in which four switching elements and one current detecting resistor are incorporated. Hereafter, the seventh embodiment of the invention will be described based on FIG. 13, which is a system configuration diagram according to the power converting device 105.

Figure 13:
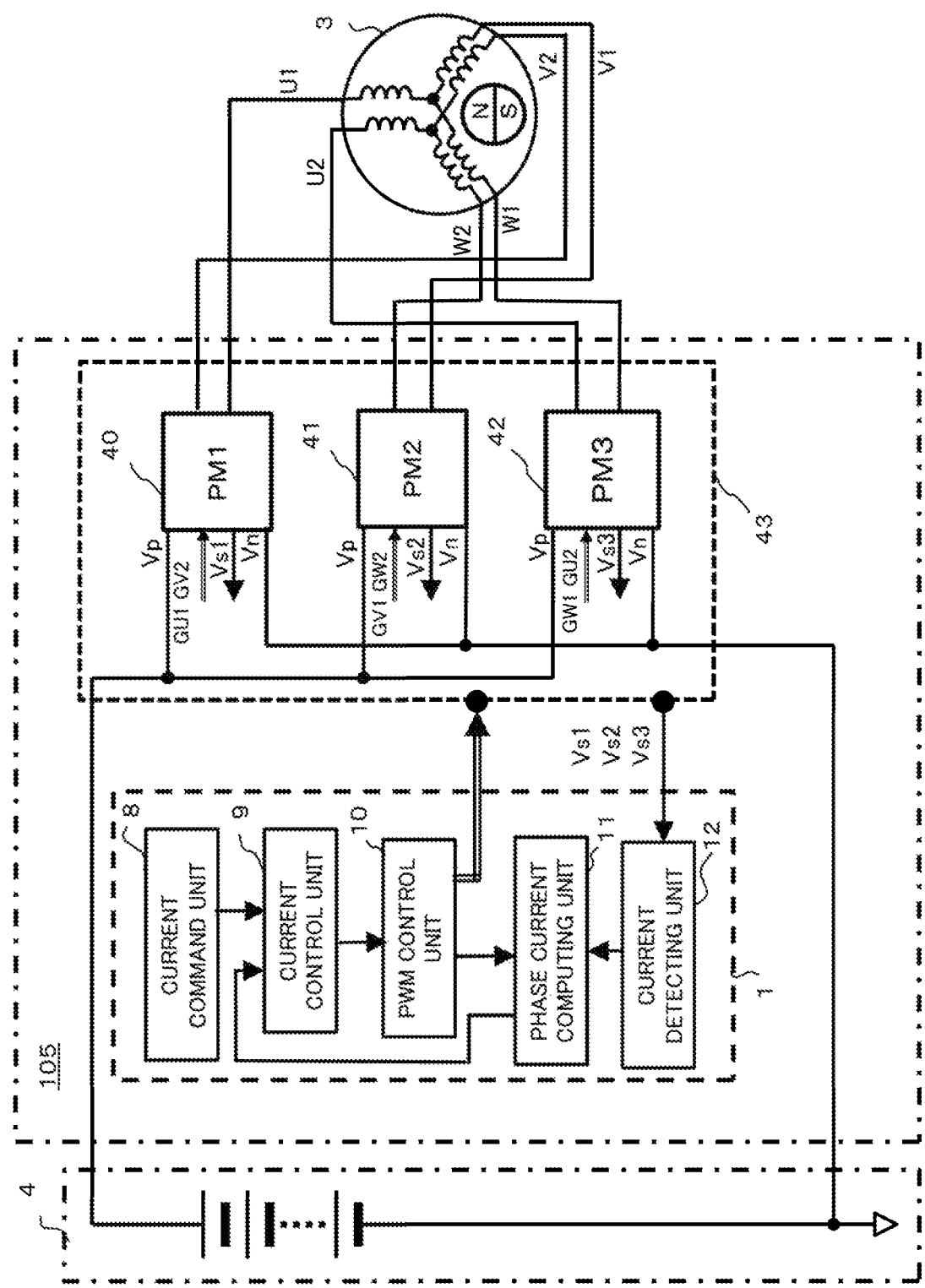
FIG. 13 is a system configuration diagram according to a power converting device of a seventh embodiment of the invention.

In FIG. 13, the same reference signs are allotted to portions identical to or corresponding to portions of FIG. 1. FIG. 13, differing from the first embodiment, shows a system configuration of the power converting device 105 including the power converter control unit 1, which carries out a switching operation of a power converter 43 using three power modules 40, 41, and 42, and detects phase current using a current detecting resistor in a power module interior.

In the seventh embodiment, the current detecting unit 12 detects the current values I1, I2, and I3 flowing through an interior of the power converter 43 twice within one PWM control carrier cycle using voltages Vs1, Vs2, and Vs3 generated by the current detecting resistor in the module interior, in accordance with a carrier signal output timing of each group of the PWM control unit 10, outputs the three-phase currents iu, iv, and iw of each group, and carries out a voltage command computation, in the same way as in the first embodiment. The three-phase voltage Commands are converted by PWM processing into the gate signals GU1, GV1, GW1, GU2, GV2, and GW3 in the PWM control unit 10, and output to the power converter 43, thereby driving the power modules 40, 41, and 42 configuring the power converter 43.

Figure 14:
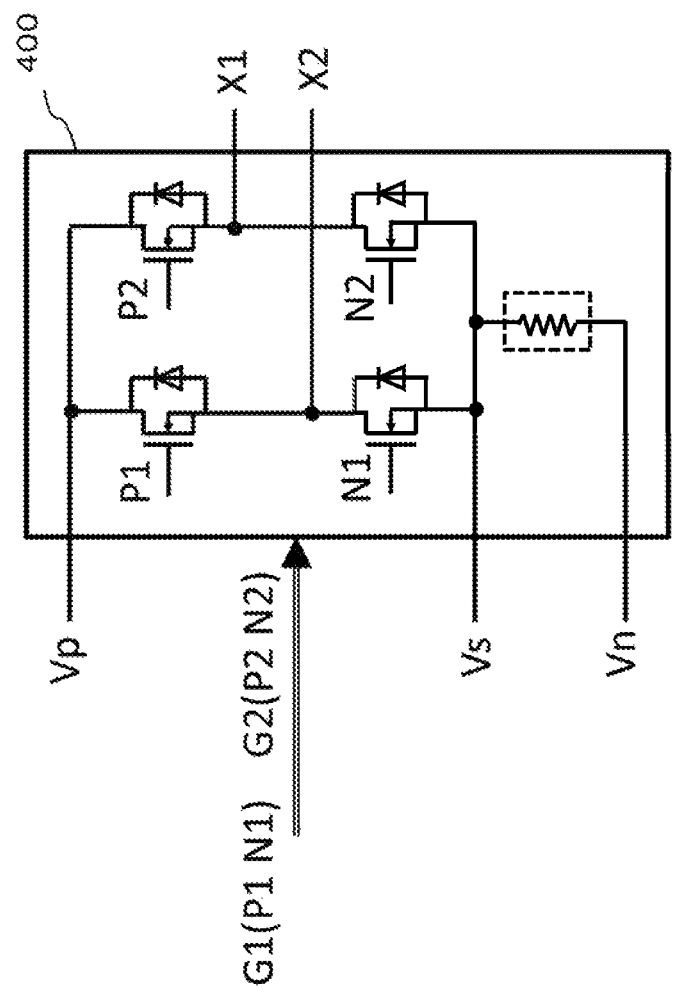
FIG. 14 is a module diagram, for realizing the seventh embodiment of the invention.

FIG. 14 is a diagram representing an internal configuration of the power modules 40, 41, and 42. Four-switching elements and one current detecting resistor are incorporated in a module 400. The positive side voltage Vp and the negative side voltage Vn of a direct current power supply are connected to the module 400, and one group of legs is configured of a positive side switching element driven by a gate signal P1 and a negative side switching element driven by a gate signal N1, wherein two legs are incorporated in the module, and output voltages X1 and X2 for driving a motor. The current detecting resistor is connected to a negative side power supply, detects a total current, flowing through the legs, and outputs a voltage Vs.

As heretofore described, the power converting device according to the seventh embodiment is of a configuration that controls using a module in which switching elements are incorporated, and configures the same kind of control as in the first embodiment with fewer parts, because of which the motor can be controlled at low cost.

Eighth Embodiment

A power converting device 106 according to an eighth embodiment is of a configuration that controls the motor 3 using a power module in which a multiple of switching elements are incorporated, in the same way as in the sixth embodiment. Herein, the power converting device 106 is configured using a module in which six switching elements are incorporated, and no resistor for current detection is incorporated. Hereafter, the eighth embodiment of the invention will be described based on FIG. 15, which is a system configuration diagram according to the power converting device 106.

Figure 15:
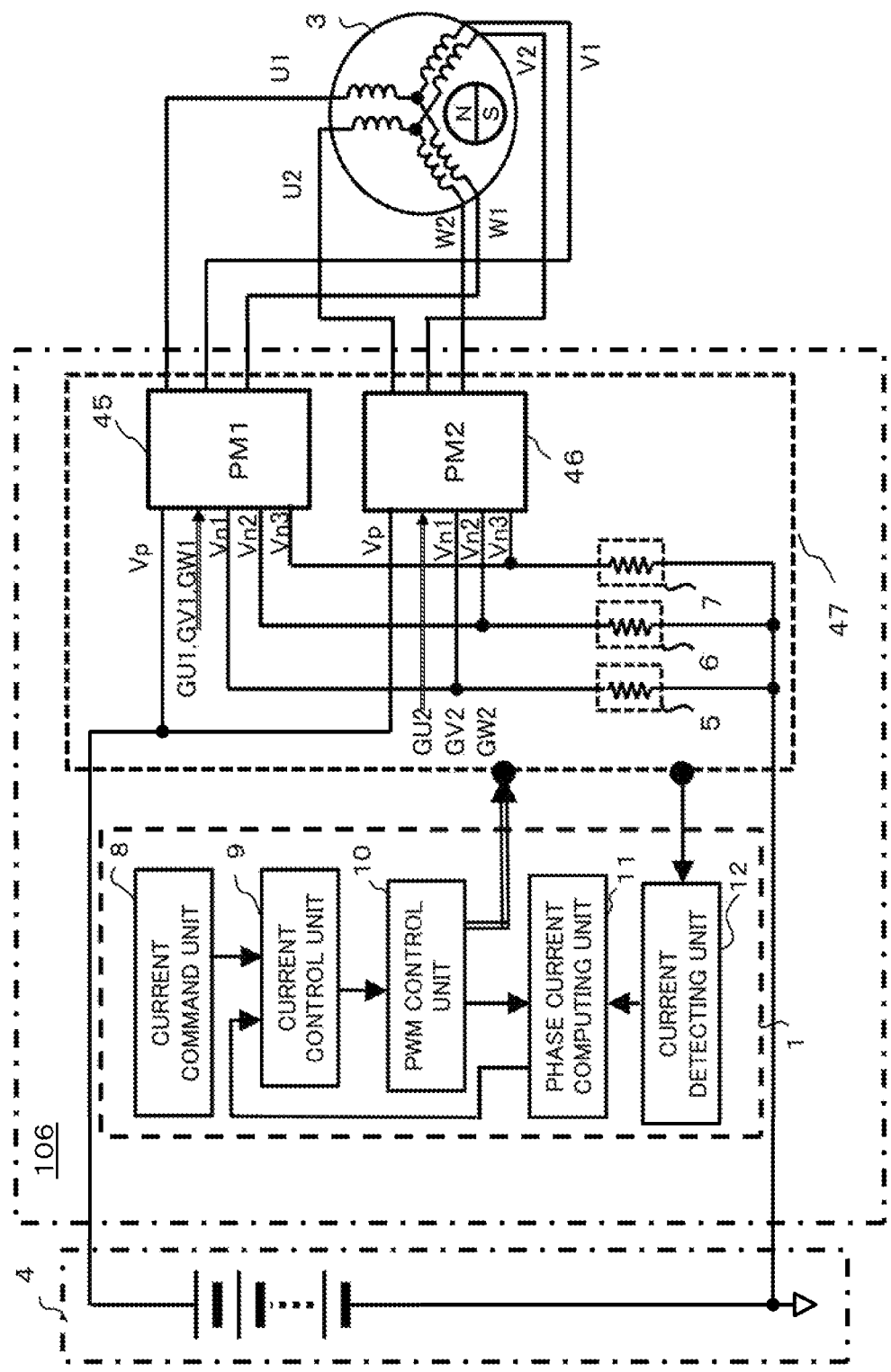
FIG. 15 is a system configuration diagram according to a power converting device of an eighth embodiment of the invention.

In FIG. 15, the same reference signs are allotted to portions identical to or corresponding to portions of FIG. 1. FIG. 15, differing from the first embodiment, shows a system configuration of the power converting device 106 including the power converter control unit 1, which carries out a switching operation of a power converter 47 configured of two power modules 45 and 46, and detects phase current using the current detectors 5, 6, and 7.

In the eighth embodiment, a configuration is such that a resistor for current detection is connected to a module exterior, specific phases of the power module 45 and the power module 46 are combined, and a total negative side current flows, and the current detecting unit 12 detects the current values I1, I2, and I3 flowing through the current detectors 5, 6, and 7 in an interior of the power converter 2 twice within, one PWM control carrier cycle, in accordance with a carrier signal output timing of each group of the PWM control unit 10, outputs the three-phase currents iu, iv, and iw of each group, and carries out a voltage command computation, in the same way as in the first embodiment.

The three-phase voltage commands are converted by PWM processing into the gate signals GU1, GV1, GW1, GU2, GV2, and GW3 in the PWM control unit 10, and output to the power converter 47, thereby driving the power modules 45 and 46 configuring the power converter 47.

Figure 16:
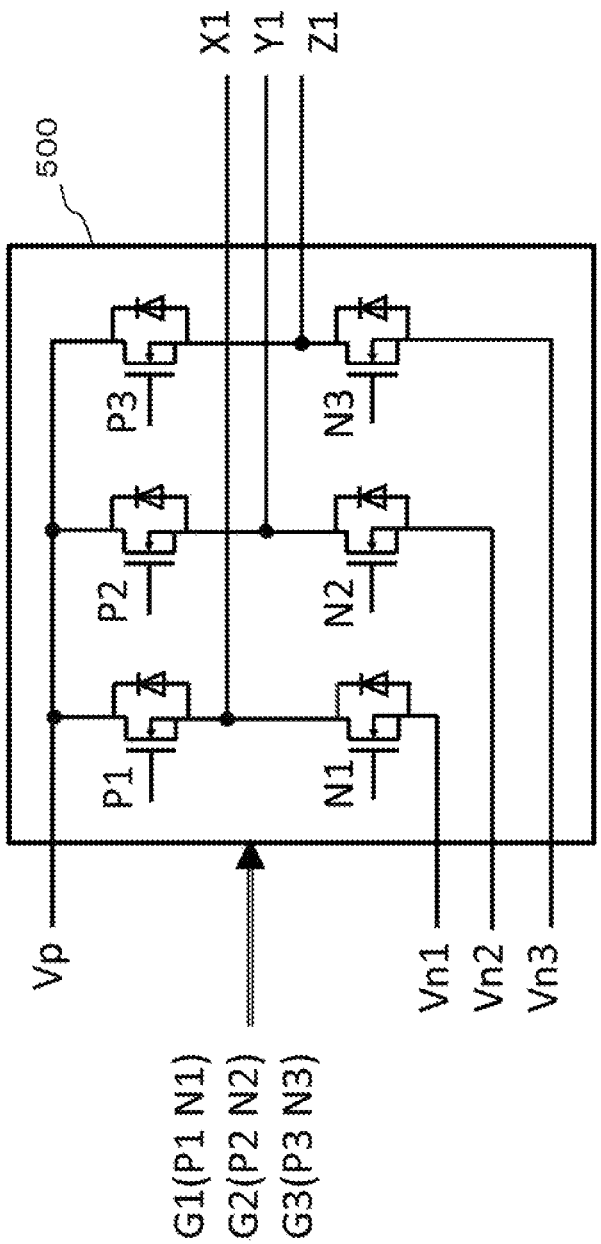
FIG. 16 is a module diagram for realizing, the eighth embodiment of the invention.

FIG. 16 is a diagram representing an internal configuration of the power modules 45 and 46. Six switching elements are incorporated in a module 500, the positive side voltage Vp and the negative side voltage Vn of a direct current power supply are connected, and one group of legs is configured of a positive side switching element driven by the gate signal P1 and a negative side switching element driven by the gate signal N1, wherein three legs are incorporated in the module, and output voltages X1, X2, and X3 for driving a motor. The negative side voltage Vn of each leg is output at each terminal independently.

As heretofore described, the power converting device according to the eighth embodiment is of a configuration that controls using a module in which switching elements are incorporated, and configures the same kind of control as in the first embodiment with fewer parts, because of which the motor can be controlled at low cost.

Herein, each function of the current command unit 8, the current control unit 9, the PWM control unit 10, the phase current computing unit 11, and the current detecting unit 12, which are components of the power converter control unit 1 shown in the first embodiment to the eighth embodiment, is realized by a processing circuit. The processing circuit may be dedicated hardware, such as a processor 23 shown in FIG. 17, or a processor 26 (also called a CPU (central processing unit), a central processing device, a processing device, a computing device, a microprocessor, a microcomputer, or a DSP) that executes a program stored, in a memory shown in FIG. 18.

Figure 17:
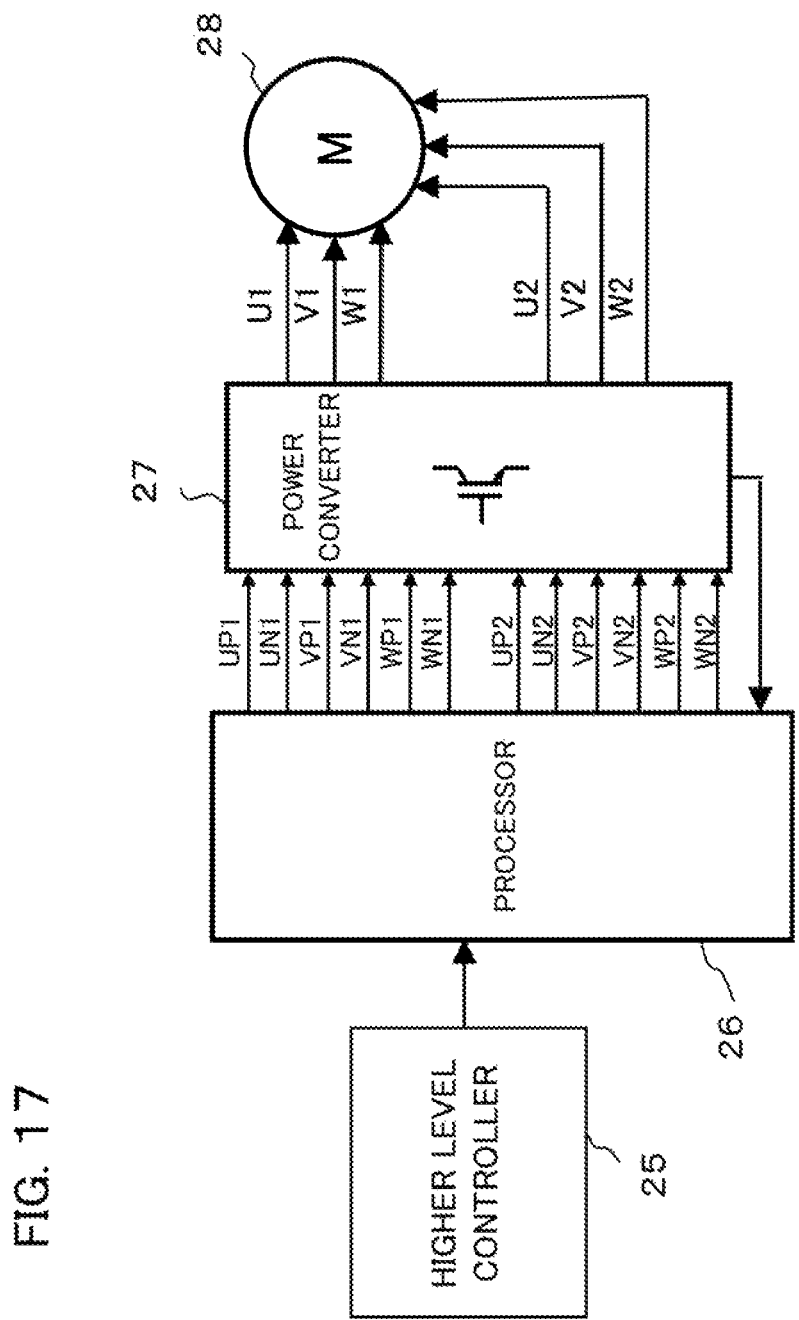
FIG. 17 is a system configuration diagram, for realizing the embodiments of the invention.

FIG. 17 is a configuration for controlling the configuration shown in the heretofore described kinds of embodiment using dedicated hardware, or software of a microcomputer or the like. In FIG. 17, 25 is a higher level controller, 26 is the processor for controlling a power converter, 27 is a power converter including a multiple of current detectors, and 28 is a motor.

When the processing circuit is dedicated hardware, a single circuit, a composite circuit, a programmable processor, a parallelized processor, an ASIC, an FPGA, a CPLD, or a combination of these, is appropriate as the processing circuit. Each function of the current command unit 8, the current control unit 9, the PWM control unit 10, the phase current computing unit 11, and the current detecting unit 12 may be individually realized by the processing circuit, or the functions may be collectively realized by the processing circuit.

Figure 18:
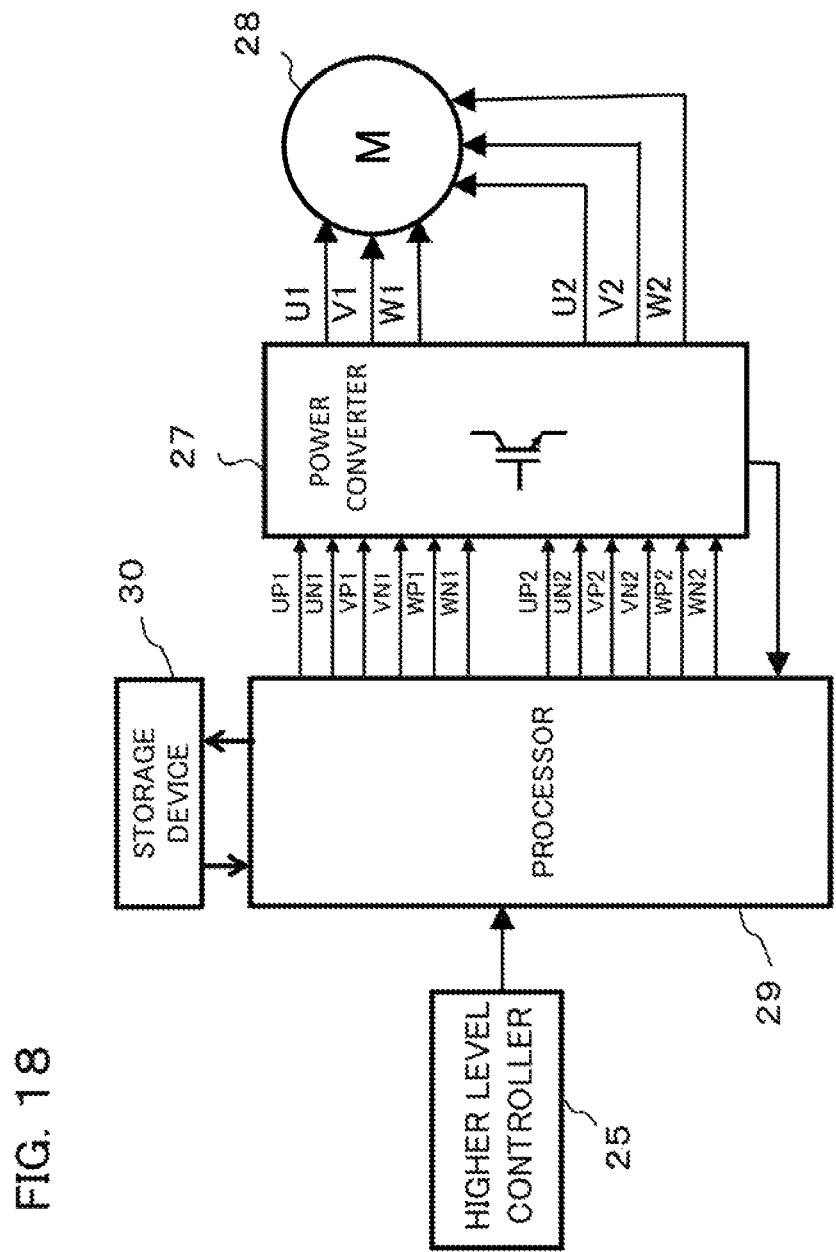
FIG. 18 is a system configuration diagram for realizing the embodiments of the invention.

Also, in FIG. 18, the higher level controller 25 provides a command value to the processor 29, and the processor 29 carries out current control or PWM control by carrying out data processing such as holding data in a storage device 30, and outputs a switching pulse to the power converter 27. Lower arm current flowing into a switching element connected, to a winding in each phase of each group is detected in the power converter 27, and output to the processor 29. The processor 29 detects and calculates phase current in accordance with a timing of a carrier signal of the switching pulse to be output.

When the processing circuit is the processor 29, as shown in FIG. 18, each function of the current command unit 8, the current control unit 9, the PWM control unit 10, the phase current computing unit 11, and the current detecting unit 12 is realized by software, firmware, or a combination of software and firmware. The software or firmware is described as a program, and stored in the storage device 30.

The processing circuit realizes each function by reading and executing the programs stored in the storage device 30. That is, the processing circuit includes the storage device 30 for storing programs such that each step of the current command unit 8, the current control unit 9, the PWM control unit 10, the phase current computing unit 11, and the current detecting unit 12 is resultantly executed. Also, it can also be said that these programs are programs that cause procedures and methods of the current command unit 8, the current control unit 9, the PWM control unit 10, the phase current computing unit 11, and the current detecting unit 12 to be executed by a computer.

Also, for example, a non-volatile semiconductor memory such as a ROM, an EPROM, an EEPROM, or a flash memory, a volatile semiconductor memory such as an SRAM or an SDRAM, or as another storage device, a magnetic disk, an optical disk, or the like, is appropriate as the storage device 30. Also, one portion of the functions of the current command unit 8, the current control unit 9, the PWM control unit 10, the phase current computing unit 11, and the current detecting unit 12 may be realized by dedicated hardware, and one portion realized by software or firmware.

For example, the function of the current detecting unit 12 can be realized by a processing circuit as dedicated hardware, and the functions of the current command unit 8, the current control unit 9, the PWM control unit 10, and the phase current computing unit 11 can be realized by a processing circuit reading and executing programs stored in the storage device 30.

In this way, the processing circuit can realize each of the previously described functions using hardware, software, firmware, or a combination of these.

As heretofore described, power converter control can be processed using software, and can be realized at low cost.

Also, arbitrary components of the embodiments can be changed or omitted as appropriate, without departing from the scope of the invention.

The invention claimed is:
1. A power converting device, comprising:
 a power converter configured to supply power to a plurality of multi-phase windings of a motor using a plurality of bridge-connected switching elements including at least a first switching element and a second switching element, wherein the power converter includes a plurality of current detectors including at least a first current detector; and
 a power converter controller configured to generate a PWM signal that controls the power converter and a plurality of winding groups including at least a first winding group and a second winding group,
 wherein the first current detector is connected to a first switching element connected to a first phase of the first winding group and a second switching element connected to a second phase of the second winding group, and the first current detector is configured to detect total value of a first value of current flowing into the first switching element and a second value of current flowing into the second switching element, and wherein the power converter controller is configured to control the first winding group using a first carrier signal, control the second winding group using a second carrier signal, and carry out current detection when an on/off state of the first switching element connected to the first current detector differs from an on/off state of the second switching element connected to the first current detector by causing a phase of the first carrier signal and a phase of the second carrier signal to deviate within a phase range, and wherein the power converter controller generates the PWM signal in accordance with current detected by the first current detector.

2. The power converting device according to claim 1, wherein the first current detector is configured to detect the total value twice during one cycle of the first carrier signal and the second carrier signal.

3. The power converting device according to claim 1, wherein the power converter controller, when connecting two specific phases flowing into the current detector, is configured to select the two specific phases so that a time for which any one of the phase currents only flows into the current detector during one cycle increases by combining a specific phase of the first winding group and a specific phase of the second winding group such that phases of carrier signals provided to the power converter controller are distanced from each other by a phase in a range of 150 degrees to 210 degrees.

4. The power converting device according to claim 1, wherein the plurality of multi-phase windings are multi-phase windings of a plurality of differing motors, and the power converter is configured to control the plurality of motors.

5. The power converting device according to claim 1, wherein the power converter controller is further configured to control the power converter by restricting current flowing into a field winding of the motor so that at least two phases of current of the plurality of current detectors flow into the plurality of current detectors during one cycle.

6. The power converting device according to claim 1, wherein the plurality of multi-phase windings are multiplexed and are connected to the power converter in a winding group of two or more phases, and an electrical phase difference among the winding group is a phase difference in a range of 20 degrees to 40 degrees.

7. The power converting device according to claim 1, wherein the power converter controller is further configured to control the power converter by restricting a modulation rate of voltage applied to the power converter to a preset certain value or less so that at least two phases of current flow into a same one of the plurality of current detectors during one cycle.

8. The power converting device according to claim 1, wherein the power converter controller is further configured to control the power converter by stepping-up voltage applied to the power converter so that at least two phases of current flow into a same one of the plurality of current detectors during one cycle.

9. The power converting device according to claim 1, wherein the power converter includes a module in which a plurality of switching elements are incorporated, and the current detector is connected to an exterior of the module.

10. The power converting device according to claim 1, wherein the power converter is a module in which a plurality of switching elements and a current detecting resistor are incorporated.

11. The power converting device according to claim 1, wherein a period of the first carrier signal is same as a period of the second carrier signal, and the phase of the first carrier signal and the phase of the second carrier signal are deviated from each other.

12. The power converting device according to claim 1, wherein one end of the first switching element is connected to the second switching element, the current detector includes a resistor having one end connected to a connection point between the first switching element and the second switching element.

* * * * *